United States Patent
Cohen et al.

(10) Patent No.: US 9,498,704 B1
(45) Date of Patent: Nov. 22, 2016

(54) METHOD AND SYSTEM FOR LEARNING AND COGNITIVE TRAINING IN A VIRTUAL ENVIRONMENT

(71) Applicant: Cignition, Inc., Portola Valley, CA (US)

(72) Inventors: Michael H. Cohen, Portola Valley, CA (US); Jennifer Balogh-Ghosh, Menlo Park, CA (US); Niloufar Valorie Salimpoor, Vancouver (CA)

(73) Assignee: Cignition, Inc., Portola Valley, CA (US)

( * ) Notice: Subject to any disclaimer, the term of this patent is extended or adjusted under 35 U.S.C. 154(b) by 243 days.

(21) Appl. No.: 14/492,937

(22) Filed: Sep. 22, 2014

Related U.S. Application Data

(60) Provisional application No. 61/881,219, filed on Sep. 23, 2013.

(51) Int. Cl.
    *A63F 13/10* (2006.01)
    *A63F 9/18* (2006.01)
    *G09B 5/00* (2006.01)

(52) U.S. Cl.
    CPC .................. *A63F 9/183* (2013.01); *G09B 5/00* (2013.01)

(58) Field of Classification Search
    USPC ............................................... 463/9
    See application file for complete search history.

(56) References Cited

U.S. PATENT DOCUMENTS

| | | | |
|---|---|---|---|
| 7,025,675 B2* | 4/2006 | Fogel | A63F 13/12 345/473 |
| 2004/0053690 A1* | 3/2004 | Fogel | A63F 13/12 463/31 |

* cited by examiner

*Primary Examiner* — Pierre E Elisca
(74) *Attorney, Agent, or Firm* — Kilpatrick Townsend & Stockton LLP

(57) ABSTRACT

A system and method implemented as computer-based, computer-executable instructions employing a computation engine with digital storage provide a virtual environment with personalized user profiles specifically adapted to cognitive abilities of the user to train the user for specified tasks, herein called microtasks. The set of microtasks include achievement criteria. The virtual environment is controlled through an engine that automatically adapts the set of user-profile-specific microtasks to achieve a set of learning goals. The engine may calculate and/or measure a set of qualities associated with one or more sub-profiles associated with a given user based on game-type performance by that user either in isolation or among a group of users. Sub-profiles may include, but are not limited to, one or more of the following: a personality profile, a neural link profile, and/or a motivation profile.

19 Claims, 9 Drawing Sheets

METHOD AND SYSTEM FOR LEARNING AND COGNITIVE TRAINING IN A VIRTUAL ENVIRONMENT

CROSS-REFERENCES TO RELATED APPLICATIONS

This application claims benefit of priority under 35 USC 119(e) to Provisional Patent Application Ser. No. 61/881,219 filed Sep. 23, 2013.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable. Appendix included with specification

BACKGROUND OF THE INVENTION

This invention relates to systems and methodologies in a virtual environment for training and education. Video games and virtual worlds have been associated with one another. Educational environments are known that employ virtual worlds and video game techniques. Examples follow.

Three dimensional virtual worlds, such as Second Life, provide modeling tools based on simple geometric shapes and allow residents to build virtual objects.

Massively multiplayer online role-playing games (MMORPG) are a genre of role-playing video games or web browser based games in which a very large number of players interact with one another within a virtual game world. The world continues to exist and evolve even when a given player is "offline" and away from the game Educators (e.g., MicroMuse and Diversity University) use MMORPGs for learning purposes. MicroMuse is a multi-user simulation environment that features explorations, adventures, and puzzles with an engaging mix of social, cultural, and educational content. Diversity University allows people to connect in real-time to an online realm. A server tracks which characters are in each virtual "room," so that the comments of each character can be sent back to every other person whose character was "in" the same virtual "room." Diversity University was structured as a virtual university campus and pioneered actual online classes. It included immersive reenactments of literary texts such as Dante's Inferno in which students recreated some of the circles of Hell, populated with virtual robots that could interact with one another and with visitors to the site.

Other efforts include the 3D Avatar School (3DAS). 3DAS places live English teachers in a 3D virtual environment to deliver English lessons through the use of avatar characters. Following structured lesson plans, students gain new skills and abilities through adventure games where they explore planets, embark on quests, play against each other, their teacher and the virtual environment. Lesson progress, completion and performance data is recorded after each lesson in the Learning Management System (LMS).

The procedural Linden Scripting Language can be used to add interactivity to objects. Sculpted prims (sculpties), mesh, textures for clothing or other objects, animations, and gestures can be created using external software and imported.

Finally, Lumosity, and similar training regimes, provide working memory training exercises based on research in the area of neuroplasticity.

There remains, however, a need for a more robust model of learning including greater transfer and generalization of working memory and other skills. See, Putting Brain Training to the Test, Owen et al., *Nature,* 465(7299): 775-778 (Jun. 10, 2010).

SUMMARY OF THE INVENTION

According to the invention, a system and method implemented as computer-based, computer-executable instructions employing a computation engine with associated digital storage provide a virtual world with personalized user profiles specifically adapted to cognitive and other abilities of the users to train the users for specified tasks.

A user profile may comprise a set of sub-profiles. A set of microtasks, as herein defined, provide training and allow measurement of a set of qualities embodied in one or more sub-profiles. The set of microtasks may support completion of at least one of a set of subtasks. The virtual world is controlled through a computation engine and associated digital memory that automatically adapts the set of user-profile-specific microtasks to achieve a set of learning goals according to achievement criteria associated with the microtasks.

In specific embodiments, the engine may calculate and/or measure a set of qualities associated with one or more sub-profiles associated with a given user based on game-type performance by that user either in isolation or among a group of users. Sub-profiles may include, but are not limited to, one or more of the following: a personality profile, a neural link profile, and/or a motivation profile.

In one embodiment, a personality profile may include an assessment, calculated by the engine, of whether a user is drawn to high stress action or more relaxing activities; whether a user is drawn to high risk or low risk; whether a user is highly explorative or less explorative; whether a user is social or a loner; whether a user is competitive or collaborative; and/or whether a user is ambitious or laid-back.

In another embodiment, a neural link profile may comprise a set of nodes and linkages, with associated node strength values and link strength values that are calculated by the engine. A node strength represents how well an individual understands that node (which represents a skill or knowledge item). A link strength represents the strength of an individual's connection between a set of nodes connected by the link.

In a further embodiment, a motivation profile may comprise a set of assessments that may include one or more of the following: a first motivation assessment calculated by using different task complexity increase rates, a second motivation assessment calculated using different levels of user performance (for example measured in percent success), and/or a third motivation assessment calculated using different problem and problem-type repetition rates.

The computation engine may calculate whether the user's performance on a given microtask or problem is inadequate given a set of learning goals juxtaposed with that user profile. The engine may create a contextually appropriate hint for the given microtask based, at least in part, on a set of qualities from the user profile or sub-profiles.

The computation engine may generate one or more hints including, but not limited to, a hint derived from said user's mental model (e.g., display a number line to help a user solve the problem); a subliminal visual hint (e.g., answer, problem structure, strategy (e.g., demonstrate near-10s strategy on number line or rectangular array)) for a predetermined period of time; a subliminal musical hint (e.g. leitmotif); and/or a subliminal movement hint for a predetermined and/or calculated period of time. The length of time for a subliminal hint comprises the length of time the subliminal hint appears on the screen and may be set by the engine (possibly based on profile) or by an administrator. Subliminal length may be calculated so that it is subliminal (i.e., short enough so that it is not consciously perceived but long enough so that it has an impact). The minimum and maximum lengths/thresholds for a subliminal hint may be calculated using known experiments in the field of psychophysics and may be verified through testing provided via the game engine or auxiliary experiments. Alternatively, a leitmotif may be considered subliminal but may not be subject to the same minimum/maximum thresholds as other subliminal hints.

A system according to the invention may include an application programming interface (API) for controlling access (e.g., function calls, object instantiations, requests, etc.), access to a profile representing a user from a first computation engine, access to a set of microtasks from the first engine, and performance reporting features allowing communication of results on a set of microtasks performed by the user in a second engine back to the first engine.

The invention will be better understood upon reference to the following detailed description in connection with the accompanying drawings.

DETAILED DESCRIPTION OF THE INVENTION

Figure 1:
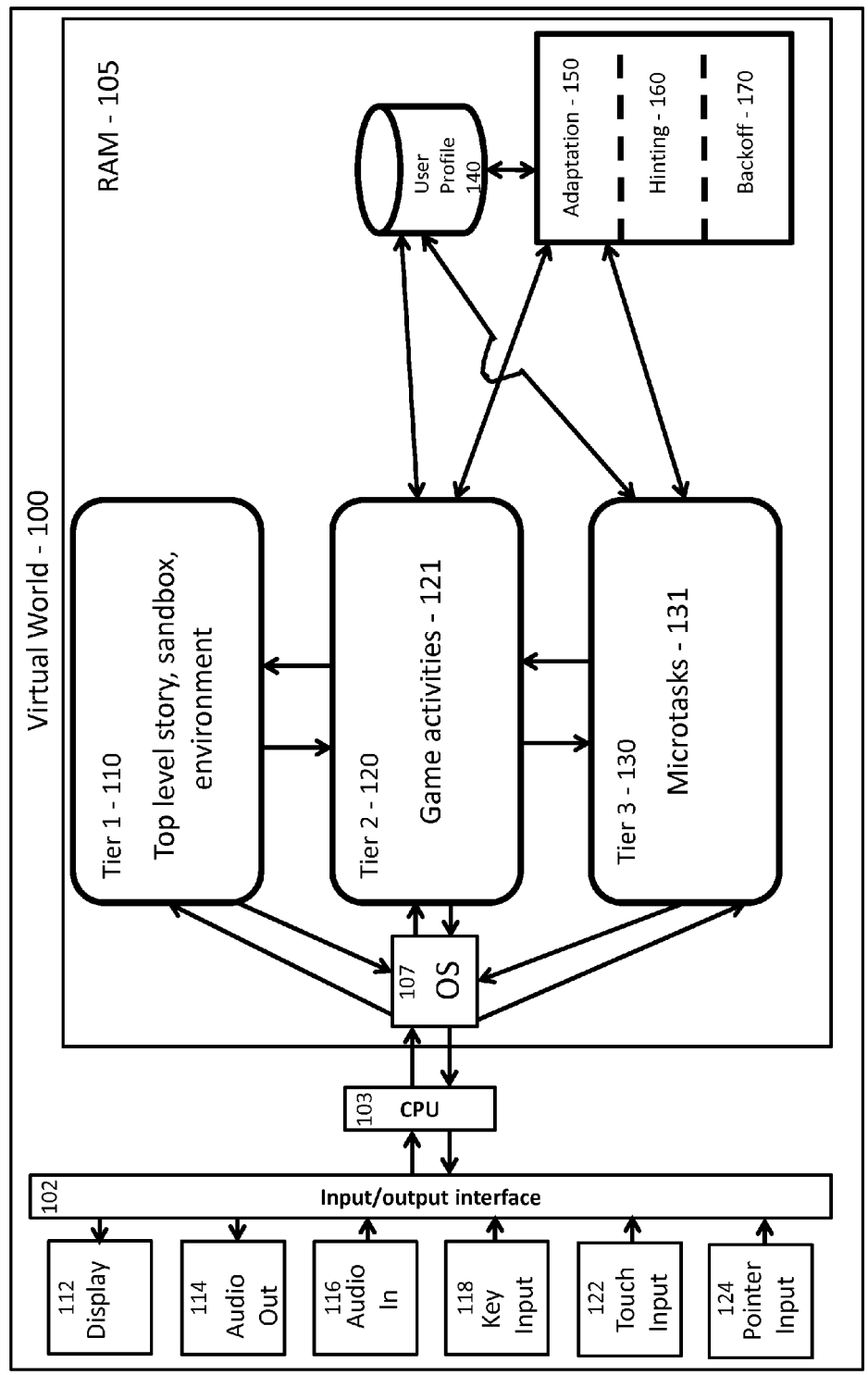
FIG. 1 is a conceptual block diagram of an exemplary high-level architecture for a virtual world implemented as a processor-controlled system according to the invention.

The methods and systems may be implemented in dedicated devices, including interconnections between devices. Each block of the flowchart illustrations and combinations of blocks in the flowchart illustrations represent specific functions implemented by computer program instructions executed by one or more processors under control of an operating system. Computer program instructions according to the invention may be provided to the one or more processors of a general-purpose computer system, of a special purpose computer, or of another programmable data processing apparatus to yield a special purpose machine, such that the instructions which execute via the processor of the computer or other programmable data processing apparatus, create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also cause a series of operational steps to be performed on the computer or other programmable apparatus to produce a computer implemented process such that the instructions that execute on the computer or other programmable apparatus provide steps for implementing the functions specified in the flowchart block or blocks.

Selected Definitions

"Adaptation Module" an element that may be used by a computation engine to automatically optimize learning by personalizing many aspects of game play, specific problem choice, problem difficulty, feedback, hinting approaches, etc.

"Automaticity" is the ability to recall specific knowledge directly from long-term memory rather than by computation. For example, if one knows the 5 times multiplication table, the answer to the question, "What is five times six?" can be immediately recalled from long-term memory rather than determined via computation.

"Automaticity Measures" include methods for determination of which sets of facts the user can access by recall from long term memory versus the need to mentally compute (e.g., by counting or other strategies). For example, response time tracking may be utilized as an automaticity measure.

"Automatization Techniques" include methods to create automaticity of specific facts for the user through the use of time constraints, competitive constraints, and other constraints to put pressure on a given user in coming up with answers.

"Avatar" is a graphical virtual character construct stored in a computer memory further comprising a profile that represents a "brain" (e.g., scores, other definable characteristics relating to specific knowledge/memory/learning/experiences, etc.) among other characteristics. It may be controlled directly by a human or through a game engine.

"Chunking" includes the ability to recognize multiple items as a meaningful group. For example, when learning to read new words, one gradually develops the ability to recognize an entire word as a meaningful entity rather than having to sound it out letter-by-letter.

"Cognitive Ability" is the ability to hold in consciousness concepts, access sensory inputs, control attentional resources, and manipulate, singly or in combination, concepts and sensory inputs, whether immediate or retained, to achieve a task.

"Computer Machine/Computation Engine" is a component containing at least one processor that has been specially configured with a set of computer executable instructions. A game engine is one example of a computer machine. Other examples include personal or networked computers, desktops, laptops, tablets, smartphones, and servers, as well as other current or future computer machine instantiations.

"Computer Memory" is a non-transitory digital data storage component, whether directly addressable or accessible as mass storage from or within a computer machine. It may be configured as volatile or non-volatile memory including RAM (e.g., SRAM, DRAM, ROM and/or other types of random access memory), caches, flash memory, registers, compact discs (CDs), digital versatile discs (DVD), and/or other types of storage components. A memory component may also include operating logic that, when executed, facilitates the operations described herein.

"Generality Measures" are metrics that include a determination based on, for example, speed and accuracy, of a specific user's mastery of a skill based on performance of one or more microtasks which differ from those utilized in training for that specific user.

"Generality Techniques" are methods used to help a user increase the generality of skills, and may include the use of a cluster of distributed microtasks that achieve the same underlying conceptual structure and mental model, and may exercise the skill from the context of many different surface problems. The techniques may employ the use of non-subliminal hints and/or subliminal hints when useful to emphasize correlations in underlying structure/strategies —and may eventually include possible discussion from a Mentor (e.g., in the form of an automated avatar) on a relationship between the problems, and may then present more microtasks showing even more angles on the same underlying concepts or skill. It may also include an emphasis on mental manipulations (e.g., mental arithmetic to reinforce general number sense).

"GUI" or "Graphical User Interface" is a user interface that allows users to interact with electronic devices via images (e.g., maps, grids, lists, hyperlinks, panels, etc.) displayed on a visual subsystem.

A "Link Structure" is a data structure encoded in a computer memory that includes at least two nodes and at least one link connecting the at least two nodes.

A "Leitmotif" is a theme of an embodiment wherein a user has been conditioned through experiences, presented by an engine, to associate a particular set of notes/sounds with a particular concept. It may be loaded into a hint profile to be provided to a user who is in need of a specific hint.

"Mathematical Ability," a subset of cognitive ability, is the ability to process mathematical tasks based on mathematical concepts, including patterns.

A "Mental Model" comprises internal mental constructs used to understand aspects of the outside world. For example, when teaching math, the mental model of a "number line" is often taught because it can be flexibly applied to many aspects of the number system (e.g., addition, subtraction, fractions, negative numbers, etc.).

"Mentor" as used herein is an avatar, operated by the game engine rather than by another human, that provides occasional advice, coaching, help, encouragement and may even introduce some challenges. A mentor may also introduce sub-modules such as micro-training exercises to help prepare the user to tackle a larger and/or more complex problem. A mentor may also introduce new challenges or adventures to a user. A mentor may be customized by a user to a specific profile including attributes such as appearance, voice, language/accent choices (formal, slang, Southern, British, etc.), and preferred method of advice (visual, auditory, or textual). User customization of a mentor profile provides a means to create a motivating, trustworthy attachment for the user. Mentors may also foster, in users, specific training activities that the user can translate into self-training exercises.

A "Microtask" is a set of learning/assessment core activities or capabilities representing any kind of fundamental learning or fundamental activity with which a metric or set of metrics can be associated, that are encoded and storable in a computer memory, and that are integrated into and support either the higher level tiers or any other activity that a user is experiencing that makes use of microtasks. These include cognitive ability, mathematical ability, scientific ability, and accumulated knowledge that can be acted upon, to the extent they can be associated with a metric or set of metrics. Associated with each microtask are achievement criteria. Microtasks may be instantiations of a category or element of skill or knowledge. A microtask (or group of microtasks) may be explicitly linked to a given category or element of skill or knowledge.

A "Profile" or "User Profile" is a data structure stored in non-transitory computer memory that is associated with an entity, such as a user.

"Salience" is a noticeable and meaningful/important relationship between an element of skill or knowledge and either: a) an aspect of the real world or virtual world within which a user is operating; or b) an aspect of the activity or challenge in the real world or virtual world in which a user is participating.

A "Sandbox" is a virtual world in which a user may freely craft its elements.

"Scaffolding" refers to the existence of related concepts, background material, and/or relationships.

"Scaffolding Techniques" are methods for identification or accessing of scaffolding for a specific user and relating the scaffolding to learning of a new concept or development of a new skill.

A "Supplemental Interface" is a programmed application that use an API to an engine to create content that is coordinated with a primary experience, whether online (e.g., game, virtual world, etc.) or offline (e.g., game played in the real world, TV program, etc.), including cases in which the primary experience may not be aware of the supplemental interface (e.g., in order to add interesting learning opportunities to existing popular games).

A "Surface form" is an activity as experienced by a user.

A "Template" is a data construct stored in a computer memory that provides a base for more specific instantiations.

A "Tier" is a data construct in form of a nested subset of characteristics that define all elements and activities of a Virtual World to enable such elements and activities to be encapsulated and manipulated.

A "User" is a player, a student, or other external entity that can interact with the systems/methodologies of a virtual world or game.

A "User Profile" is a dataset stored in a non-transitory memory further comprising one or more of the following: a working memory profile, a motivation profile, an accuracy assessment, response time assessment, delay lengths in delay tasks (e.g., how long user remembers accurately), reward profile, task complexity increase rates versus performance improvement assessment, modality assessment, strategy assessment, personality assessment, mood assessment, self-confidence assessment, automatization assessment via automaticity measures, activity preferences, learning style assessment.

"Video Games" are a category of visually oriented electronic games implemented on a computer machine wherein there is human interaction with a graphical user interface or other user interface (UI) that generates visual feedback on a video device. They may include, but are not limited to, role-playing.

A "Virtual World" is a computer machine simulation of an environment through which users interact with one another within the simulated environment and/or directly with the simulated environment.

"Working Memory" (WM) as used herein refers to human memory that has the capability to hold concepts in consciousness and to access stored concepts. It is characterized by information manipulation in combination with short-term (human) memory. As used herein the term was coined by Karl. H. Pribram, George A. Miller and Eugene Galanter in 1960. While initially it was likened to short-term memory it has evolved to include more than simply remembering information over a brief period of time to include the ability to manipulate information. Working memory represents an aspect of cognitive ability.

A "Working Memory Profile" may comprise a dataset profile of working memory capabilities. Working memory capabilities may include one or more of the following: phonological short term memory, visuo-spatial short term memory, episodic short term memory, executive working memory, executive processes including speed, inhibition, and long term memory encoding/recall. Further working memory capabilities may be identified following further research in this area. Such capabilities may also be considered for inclusion within the scope of the working memory profile. The working memory profile may be continuously or periodically calculated by an engine based on assessment of the working memory capabilities developed through game performance.

Virtual World

Referring to FIG. 1, a basic system according to the invention is depicted that form a virtual world 100 according to the invention. The virtual world 100 is implemented with a computation engine, an associated digital memory and as configured includes tiers, profiles and functions as explained below. Human users may explore and operate in the virtual world. The virtual world provides a means for a variety of goals to be achieved by training a user's working memory and executive function both directly and through gaming approaches that teach skills (e.g., multiplication) within a subject (e.g., mathematics) through manipulation of a variety of concepts. A wide variety of skills and areas of knowledge may be taught through gaming approaches. Structuring parts of the virtual world to encapsulate the structure of concepts being taught helps make the concepts intuitive (e.g., motivating the manipulation and building of specific types of structures that illustrate specific mathematical relationships). The relevance of the learning tasks to the understanding and mastery of the world that the user cares about (or, in this case, virtual world that the user cares about) enhances learning and creates in the user a mental structure within which to organize new information, insight, and procedural knowledge. Tasks within virtual worlds can be designed to encourage useful mental models (e.g., number lines to visualize whole number addition) which can then be extended to visualize other learning constructs (e.g., fractions, negative numbers, etc.). Learning tasks can be organized so as to encourage generality, automaticity of underlying facts and processes, and/or chunking. Virtual worlds provide compelling environments because users are motivated to return to advance in solving both a main adventure as well as sub-adventures and to explore and create new pieces of the virtual world. The immersion and focus encouraged by the activities in the virtual world improves learning efficiency and effectiveness.

Tiered Architecture of a Virtual World

Referring to FIG. 1, the virtual world 100 may comprise an input/output interface 102, one or more processors herein CPU 103, an operating system or OS 107 employing random access digital memory 105. The CPU 103 executes programmed steps under supervision of the OS 107 in the form of executable modules and stored data. The repository of active stored data and executable modules designated Tier 1 110, Tier 2 120 and Tier 3 130, together with an active user profile 140, and processes called adaptation 150, hinting 160, and backoff 170, as hereinafter explained, are found in random access memory RAM 105 and any associated buffers, caches and registers. For purposes of this disclosure, the active memory locations are referred to as RAM 105. It is understood that there is nonvolatile storage, such as solid state drives and disk drives or even cloud storage that are responsive to program and operating system actions, and that the nonvolatile storage may also be used as virtual active memory. Coupled to the interface element 102 are a display 112, an audio output element 114, an audio input element 116, a key input element or keyboard 118, a touch element or touchpad 122 and a pointer input element 124 or other motion sensitive apparatus, such as an accelerometer coupled to a movable device. The virtual world 100 as found in RAM 105 may be configured in a tiered architecture. The first tier 110 may comprise information content defining a sandbox, long term goals, a story, an environment, and/or context for a game activity, herein referred to as a "game realm." The second tier 120 may comprise information defining one or more compact stories, activities, approaches and/or challenges which support or relate to one or more higher level tiers. A third tier 130, comprising a set of microtasks 131, as herein defined, that includes a set of learning activities that are integrated into and support the higher level tiers that a user may be experiencing. Control may bleed from one tier to another but, generally, a user (not shown) having input/output connection with the virtual world 100 and represented in the virtual world 100 as by a user profile 140 exercises primary control in a set of middle tiers (Tier 2 120) whereas a computation engine or computer machine exercises control in the top tiers (Tier 1 110) and bottom tiers (Tier 3 130). It should be noted, however, that the designation of tiers from first 110 to third 130 is not intended to be limiting, as the number of tiers may be designed according to the level of complexity and control desired in a given game. The tiered architecture facilitates subtasks such as game activities 121 and microtasks 131 that may be applied across a wide, potentially unlimited, range of stories/activities and then adapted by the adaptation process 150 based on training data feedback received for the tasks across multiple occurrences of those tasks in a variety of storylines.

Second Tier—Components/Sub-Tasks

The activities in the second tier 120 may provide many trajectories through different activities. These may support the top level game realm of Tier 1 110. The activities and trajectories in Tier 2 120 may provide the user with a choice of activities. Component challenges/game activities 121 may be serial, asynchronous, overlapping, combinatorial, cooperative, competitive, etc. The diversity of activities (which may draw on the elements of skill, knowledge training, and assessment integrated into the microtasks in Tier 3 130 may enable the exercise of new skills and/or knowledge in a variety of contexts, may be designed to engage multiple brain areas, and may aid in the creation of a denser neural link structure that facilitates encoding/recall in and retrieving from a user's long-term memory. Components may utilize novelty, effective reward structures, social reward, uncertainty, pleasant surprises, anticipation and craving, mastery/accomplishment, appropriate reinforcement schedules, salience, sensory pleasure, opportunity for risk taking, humor, discovery, and numerous other factors to support motivation and learning effectiveness.

Third Tier—Microtasks

Microtasks 131 within Tier 3 130 may support both specific subtasks/activities 121 as well as learning skills (e.g., develop working memory, executive function, higher level skills, knowledge acquisition, etc.) and learning specific knowledge, as hereinafter explained. For simplicity the underlying platform is not shown, but it is to be understood that the invention, a virtual world, must be instantiated under control and supervision of physical devices and have functions that interact with the physical world.

Figure 2:
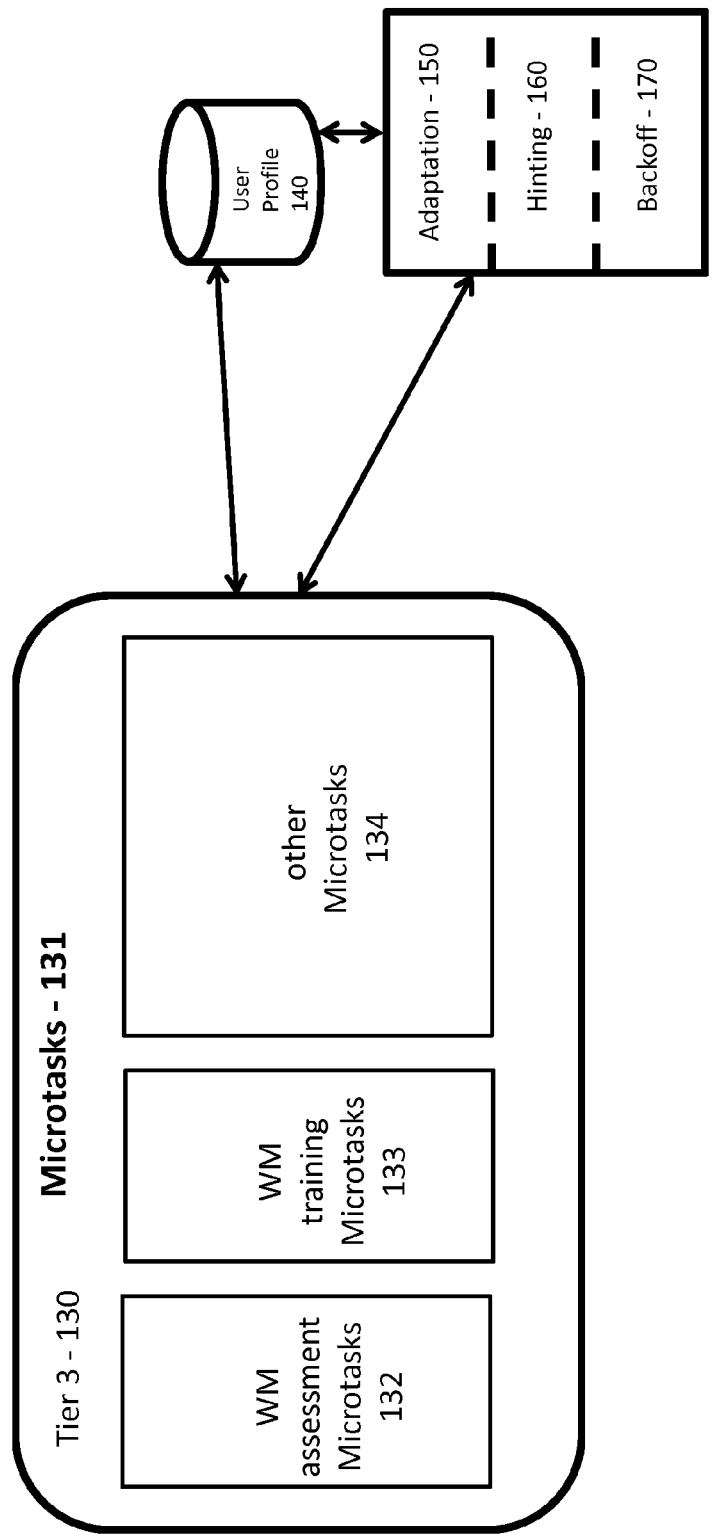
FIG. 2 is a conceptual block diagram illustrating interaction of microtasks, a user profile and functions of an engine in accordance with the invention within a virtual world.

Referring to FIG. 2, microtasks 131 may include, but are not limited to, Working Memory Assessment Microtasks 132, Working Memory Training Microtasks 133, and "other" microtasks 134. Other microtasks 134 may focus on basic elements of skill or knowledge from a variety of areas including, for example, mathematics, reading, language learning, science, history, music, etc.

Figure 4:
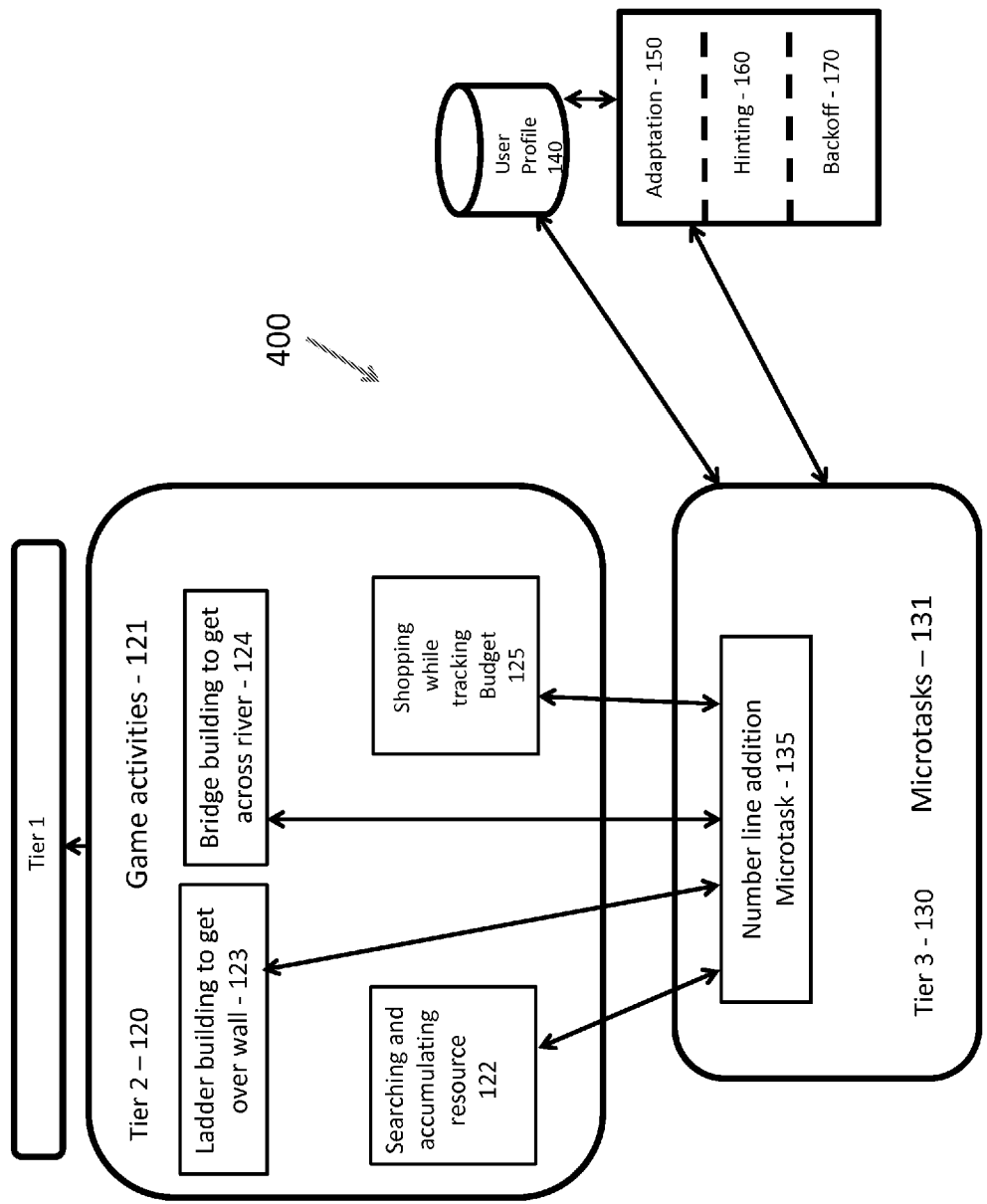
FIG. 4 is an illustration of processes involving a microtask deployed in a virtual world through an exemplary set of subtasks, and in particular a microtask enabling multiple surface form activities with unified use of profile information, adaptation, hinting, backoffs, and related accumulation of information as a result of player action.

Referring to FIG. 4, microtasks may be designed to be easily integrated into a range of activities in Tier 2 120, thus enabling the exercise and training of skills and knowledge in a variety of activities. Diversifying ways to exercise each new skill and type of knowledge facilitates generalization of skills, increases the salience of skills and knowledge by enabling integration of skill and knowledge training into tasks that are relevant to the user's experience of pursuing the long term game realm and activities of interest to them, and increases user motivation by allowing the exercise of new skills and knowledge in the context of tasks that are relevant to the user's experience of pursuing the long term game realm and activities of interest to them. For example, a "Number Line Addition" microtask 135 could be designed to train a user in mental addition by encouraging use of the mental model of a number line. This same "Number Line Addition" microtask can be used in many different game activities 121 in Tier 2 120. For example, game activities may include a task involving searching for and accumulating resources 122, a task involving building a ladder by combining differently sized pieces of ladders to climb over a wall 123, a task involving building a bridge by combining components of different sizes to get across a river 124, or a task for shopping while keeping track of a budget 125. Across all of those activities, a given user profile 140 and/or adaptation 150, hinting 160, and backoff 170 procedures may be used and updated based on user performance. Thus, the training of the skill of, for example, mental addition, based on the number line mental model, may be adapted and optimized to maximize learning effectiveness for the user, across all these and any other activities which use, in this example, the "Number Line Addition" Microtask 135. With regard to the specific examples provided herein, it should be noted that these are merely for illustration and that microtasks may be used by a variety of surface form activities and span disciplines including math, history, art, music, language learning, literature, science, and more. The development of microtasks advantageously enables a user to experience many different stories and subtasks/activities while exercising specific skills and knowledge.

An engine may adapt microtasks 131 based on a combination of one or more factors including individual user profile 140 (optionally juxtaposed with the learning goals of a given subtask) (e.g., individual adaptation), current game context (e.g., surface form adaptation), and evolution of the game based on aggregated statistics from a population of users (e.g., evolutionary adaptation).

Adaptation

Figure 3:
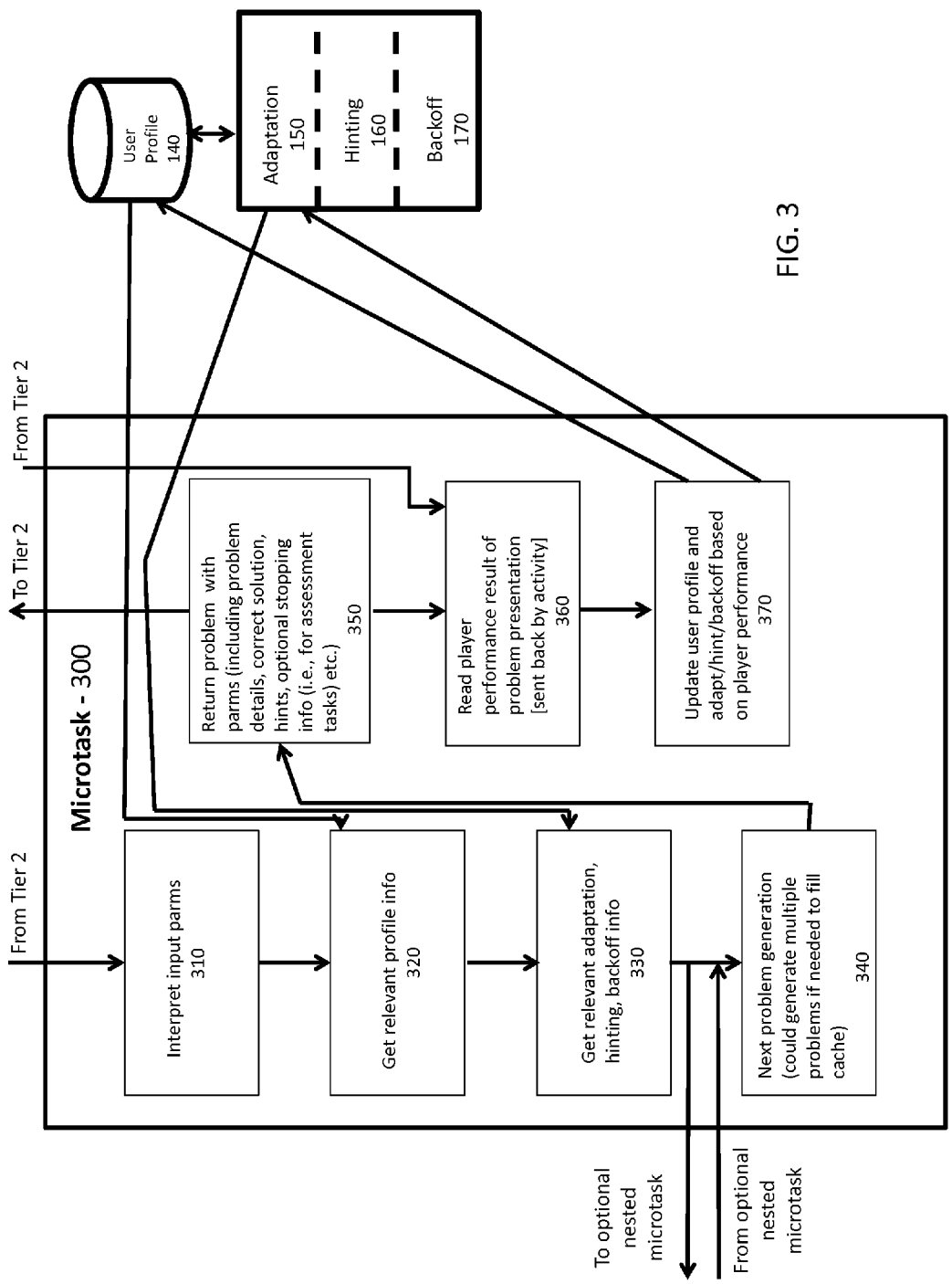
FIG. 3 illustrates a process flow chart for a microtask within the environment of FIG. 2.

Referring again to FIG. 1, an engine may utilize adaptation strategies including individual adaptation, surface form adaptation, evolutionary adaptation and more. More particularly, with regard to microtasks and referring to FIG. 3, embodiments disclosed herein may utilize a flow—a series of processes executed by an engine—to facilitate execution of a microtask. Referring to FIG. 3, in accordance with the invention, a microtask 300 may assess a set of input parameters 310 (as from Tier 2) and access relevant profiling 320, then access relevant adaptation 150, hinting 160 and backoff 170 processes. Using one or more of these computer machine inputs, the microtask may generate a problem 340 which is returned 350 (for example to Tier 2), along with one or more of problem details, correct solutions, hinting strategies, optional stopping information for assessment tasks, etc. In the course of interaction with a user, a game activity may send back a report on player performance on the problem 360 (as from Tier 2) which the game engine uses as a computer machine input to update 370 the user profile 140 and possibly update information on adaptation 150, hinting 160, and backoff 170 processes.

Individual Adaptation

An engine may adapt Tier 3 microtasks 131 (FIG. 1) by automatically calculating/assessing settings in a user profile 140 to determine whether a given microtask 300 (FIG. 3) should be modified, advanced, regressed, or provided with hints for a user to meet the specific learning goals of a given subtask/activity 121.

An engine may adapt game activities 121 or sequences of game activities as presented in Tier 2 120 by automatically calculating/assessing settings in a User Profile 140 which are relevant to Tier 2, for example reward profiles, activity preference profiles, personality profiles, mood profiles, etc.

Surface Form Adaptation

Referring to FIGS. 1-4, the engine executing the virtual world 100 may adapt and integrate a set of microtasks 131 with many different types of activities and trajectories available in the first tier 110 and second tier 120. One such adaptation may be a particular surface form calculated for the given microtask so that it seamlessly integrates into a contextually meaningful activity for a specific game subtask/activity 121. A surface form includes the presentation of the subject of the microtask to the user.

Evolutionary Adaptation

An engine may automatically assess analytics derived from aggregated performance data across users and facilitate evolution of a set of microtasks over time. (For example, microtasks may be added, deleted, enhanced, modified, etc.). An engine may also automatically assess analytics derived from aggregated performance data across users and facilitate evolution of a set of game activities or sequences of game activities over time (for example, activities may be added, deleted enhanced, modified, the order of activities may be changed, etc.). Additionally, details of activities may be changed, such as reward approaches.

User Profile

An internal model of a user—the user profile 140—may be developed and updated throughout a game. It may include both user/administrator-specified settings, as well as settings calculated by a game engine in response to performance (both individual as well as aggregated performances (aggregated across all users or clusters of users) and per user as well as in comparison to other users). The user profile 140 may include a neural linking structure graph for that user.

The user profile 140 may comprise one or more sub-profiles and/or qualities (which may be defined and/or derived from game performance) including a cognitive capability profile; a personality profile; a skill level profile; a knowledge level profile; an interest profile; a mood profile; a reward profile; a self-confidence profile; a motivational profile; a personal neural link profile; an accuracy profile; a strategy assessment profile; a learning style profile; a time series profile; and a working memory profile. Examples and explication of several of these profiles are described in the following paragraphs.

Cognitive Capability Profile+++

An important aspect of the invention is the cognitive capability profile. It may include either or both an assessment of delay lengths in delay tasks (e.g., how long the user remembers accurately), and a response time assessment.

Personality Profile+++

A useful aspect of the invention is a personality profile. The personality profile may be based on a measurement of personality characteristics on one or more of a series of spectra. Approaches to measuring such characteristics may include labeling game activity modules with where they lie on these spectra, tracking user activities, and/or creating a time series of activity type choices according to these characteristics. Once an initial set of activities is labeled, future activities added to a virtual world or game can be automatically categorized and tagged/labeled by standard clustering techniques known in the art. Many standard classification and prediction techniques can then be applied to determine a user's personality profile and can be applied to help choose candidate activities for users. Groups of similar users can be determined by standard clustering techniques to create personality types. These types can be used in many ways, for example to choose activities for a user by taking account of other users with similar profiles.

Embodiments disclosed herein may utilize a personality profile including one or more of the following characteristics, which may be represented on a spectrum or in a binary format:

whether a user is drawn to high stress action or more relaxing activities, whether a user seeks high arousal or low arousal situations, whether a user is drawn to high risk or low risk situations, whether a user is highly explorative or less explorative, whether a user is social or a loner, whether a user is competitive or collaborative, and whether a user is ambitious or laid-back.

Reward Profile+++

A reward profile may include a measure of motivation and learning effectiveness, calculated by the game engine, of different reward schedules and a measure of motivation and learning effectiveness, calculated by the game engine, of different reward types. Thus, a reward profile may include an assessment of either or both of reward schedules and reward types.

Reward schedules may include differences in timing such as variable ratio, fixed ratio, variable interval, and fixed interval. Reward schedules include the timing of rewards and what they are related to. This is an area that has been researched in detail by psychologists, game companies, and casinos. A fixed interval schedule may provide rewards at specific times regardless of what a user does. A varied interval schedule may provide rewards at variable times regardless of what a user does. A fixed ratio schedule may provide rewards based on a user actions (e.g., every time a user achieves something that is clearly defined). A variable ratio schedule may provide rewards based on user action(s), but the delivery schedule may be varied and may even appear to be random.

Reward types may include a wide diversity of things including intrinsic rewards such as mastery and/or advancement to new game levels as well as extrinsic rewards such as points, game money, praise, and/or social recognition.

Measures of motivation, for each reward schedule and each reward type (or other parameters requiring such measures of motivation), may include length of time a user stays on task, whether or not a user returns to task, and the degree to which a user chooses similar tasks in the future.

Measures of learning effectiveness, for each reward schedule and each reward type (or other parameters requiring such measures of learning effectiveness), may include how quickly and how much a user learns (for example measured in rate of accuracy improvements and magnitude of accuracy improvements).

Self-Confidence Profile

A self-confidence profile may include a calculation based on any combination of choices about tasks, teams, persistence on tasks, persistence in the face of failures/mistakes, persistence on things they find challenging, choice of harder tasks, choice to explore more in a virtual worldwide web (VWW) (e.g., a searchable web designed to cover a specific virtual world, or a set of virtual worlds, games, and/or activities), choice to practice more and seek help from a mentor and/or the VWW, choice to engage with teams and choices of teammates, drive to get to new levels, drive to stick with activity longer in a single session when nearing a level change, drive to stick with activity versus give up or do some alternative activity after a failure, making task choices that are more exploratory and willing to try new things versus choosing tasks more similar to past tasks that feel more familiar, drive to improve especially on things that feel challenging. Embodiments may include multiple self-confidence profiles for a user if there are within-user differences in self-confidence measures depending on a subject area. Within-subject differences depending on subject matter can be used as indicator of task-type starting points to build links to harder areas.

Motivational Profile

A motivational profile may include one or more of the following motivational profile elements:

how much to increase task complexity based on said user's performance improvement assessment, what performance level (e.g., measured in percent correct) to target to optimize said user's motivation, and what problem and problem-type repetition rates to target.

Motivational profile elements may be calculated by measuring motivation for each of a multiplicity of task complexity increases, performance level targets, and repetition rate targets using motivation indicators such as the length of time a user stays on task, whether or not a user returns to a task, and the degree to which a user chooses similar tasks in the future.

Accuracy Profile

An accuracy profile may be provided that accumulates accuracy scores. The accuracy profile may be subdivided by problem types and/or problem cluster types.

Strategy Assessment Profile

A strategy assessment profile may include one or more of the following:

a set of strategies chosen by the user to solve a given microtask, a set of strategies chosen by the user to solve a given problem cluster, an automatization assessment via automaticity measures, to evaluate when a given problem cluster is solved automatically by the user recalling an answer to a problem, from long-term memory, rather than computing it, and a set of mental models (e.g., a number line) utilized by the user to represent real-world constructs to solve a microtask or a problem.

A strategy assessment profile can be computed for a user in a variety of methods applied individually or in combination. Examples include response time measurements, mistake type classification based on the fact that different strategies are prone to different types of errors (illustrative examples include: a near-10s strategy is prone to the error of a user forgetting to add back in an amount subtracted out to get an addend to a near 10, the traditional multi-place addition algorithm is prone to the error of forgetting to subtract out a carry amount), and measuring the effects of subliminal strategy and mental model hints.

Learning Style Profile

Each individual has a characteristic learning style. A learning style profile may include one or more of a modality assessment and an activity preference assessment. The learning style profile may be calculated by an engine from a set of data measuring a level of effectiveness and motivation achieved by a set of different learning approaches for a given user. The engine may use the profile to optimize learning and motivation for the user by one or more of the following approaches: choosing activities that would be most effective for them, choosing modalities for presenting concepts (e.g., graphic vs. diagrammatic vs. textual vs. verbal/auditory, etc.), choosing strategies that fit their learning style, choosing mental models, choosing specific microtasks, choosing specific problems, and choosing specific hinting approaches.

Time Series Profile

A time series profile describes user performance along a number of different parameters since initial play or based on a prior specified period of time. The time series, along with other analytic data, may be aggregated with other users and drive automated evolution of the game as well as enable research projects on game mechanics and learning. A summary of the time-series profile (e.g. in the context of a timeline showing, for example, accomplishments, trajectory of skill and knowledge, working memory assessments, etc.) may be provided as computer machine input to a predictive algorithm(s) which may optimize task choice, design, and hardness choice for this user as a part of user-adaptation.

Working Memory Profile

In addition to previously mentioned assessments, a working memory profile may further comprise a phonological short term memory score derived from scoring of a set of micro-tasks directed to test phonological short term memory; a visuo-spatial short term memory score derived from scoring of a set of micro-tasks directed to test visuo-spatial short term memory; an episodic short term memory score derived from scoring of a set of micro-tasks directed to test episodic short term memory; an executive working memory score derived from scoring of a set of micro-tasks directed to test executive working memory; and an executive processing score including a speed score, an inhibition score, and/or a long term memory encoding/recall score derived from scoring of a set of micro-tasks directed to test executive processing capabilities.

Detailed measurements of working memory capabilities, derived from the scores detailed above, may be calculated based on assessment of the working memory profile developed through game performance.

Assessment Microtasks

Referring again to FIG. 2, embodiments may include ongoing and/or periodic assessments of a working memory profile, associated with a user, based on a set of WM Assessment Microtasks 132. Periodic assessments may occur over a certain time span (e.g., when transitioning between major game levels). An assessment may use a set of specific microtasks designed to test working memory while the surface form of the tasks (i.e., the microtasks as seen through the eyes of the user) may be adapted to the user's current activity and/or User Profile 140 and feel like part of the ongoing game. Working Memory Assessment Microtasks are preferably distinct from the working memory training microtasks 133 embedded throughout the game to better reflect skill generality rather than the impact of practice on specific tasks. It may also provide a more scientifically valid assessment.

Scoring

Embodiments may include approaches to scoring and/or updating profiles of a user's abilities with regard to one or more microtasks, problem types, and/or elements of various User Profiles. Many approaches are possible. For example, an adaptation of "Item Response Theory" may be utilized to score microtasks in a virtual game. The approach can be adapted to allow for both dichotomous and polytomous items as well as to allow for partial credit models. A means of computing a revised ability, after a microtask has presented one or more problems to a user, may comprise the current ability plus the quotient of residuals divided by variance. In this example, the residuals may be computed as the tally of correct user responses minus the tally of expected values for each item given current estimated ability:

$$\text{Residuals} = (\Sigma \text{Correct user responses}) - (\Sigma \text{Expected Values})$$

$$\text{Revised Ability} = (\text{Current Ability}) + (\text{Residuals}/\text{Variance}).$$

Adaptation Modules

An engine may utilize one or more of a user profile, a set of adaptation modules comprising computer-executable instructions encoded in a computer memory, and/or a representation of knowledge/concept interdependencies in a computer memory. Leveraging combinations of these components, an engine may optimize learning by personalizing many aspects of game play including, but not limited to, specific problem choice, problem hardness, feedback, hinting approaches, etc.

Adaptation modules may also respond to wrong or slow answers or skill sets assessed as lacking with a variety of backoff mechanisms that an engine selects to help the user correct identified issues and improve skills while maintaining motivation. For example, an engine may provide a backoff to a simpler problem utilizing the same structure (e.g., if user is having trouble with 97+7, then try 7+7, then 27+7, then back to 97+7) or may present a different problem that captures an insight or strategy for thinking about the original problem.

Microtasks can simultaneously exercise combinations of skills (e.g., working memory, executive function, higher level skills, knowledge acquisition, etc.) and knowledge. An engine may combine features of a User Profile by calculating a Microtask which exercises both a weak skill with a strong skill (or skills) so that a user can still progress and experience mastery/improvement while exercising weaker skills. Adaptations may be based on a User Profile and learning needs provided as computer machine input by a teacher or other third party.

Specific microtask structures may be designed to facilitate chunking, automaticity, generalization, linking to existing knowledge, the development of specific mental models, the development of specific skills, the learning of specific processes, and the learning of specific knowledge. A set of user adaptation modules may provide choices and challenges offered at varying levels of granularity including next adventure/challenge, next activity, next microtask, and next problem. The engine may adapt microtasks through personalized incrementalism. Thus, the engine may determine the best next problem, considering all strengths and weaknesses as well as the rate at which the level of challenge should increase to optimize learning and motivation for a given user. One or more of the parameters/characteristics included in a user profile (or sub-profile) may be used as computer machine input for adaptation, including, for example, working memory strengths and weaknesses; knowledge and skill strengths and weaknesses (e.g., facility with specific mathematical techniques, level of automaticity of specific mathematical knowledge such as multiplication tables, etc.); level of skill at specific problem types; reward type effectiveness; learning style; personality type; problem repetition tolerance; general activity and task preferences; mental model preferences, current scaffolding as represented in the user's personal neural link graph; current mood; and/or a calculated prediction of a user's activity preference based on a time series of activities chosen (may include both activities chosen as well as time spent in each activity) as well as clusters of activities chosen (i.e., activity types). A predictive model may be trained for each user, according to techniques known to those of skill in the art of predictive modeling, to predict their current activity-type preference. A predictive model may also be trained across users by aggregating data across users relating to any combination of task complexity increase rate preferences; problem repetition tolerance; sensory modality preferences; activity and task preferences; personality style; mental model and schema preferences; learning style preferences; working memory capabilities; problem solving strategy preferences; and/or target level of success/challenge. A wide variety of well-known analytic and machine-learning techniques can be applied to create predictive models.

For each of the parameters above, and anything else that could be tracked in a user profile, values or counts for performance statistics may be accumulated for a microtask across all surface forms for that microtask category. Therefore, as a result of these pooled counts, the number of data points for each core microtask may allow the calculation of more reliable statistics than could be calculated without the benefit of shared microtasks. For example, all number line-based addition tasks may share counts, even though the surface forms can vary between ladder building activities, rope building, bridge building, distance computing, creating arrows or missiles of specific sizes, accumulating resources, computing combined prices of sets of objects, etc. These counts may be shared, for that microtask, across all contexts/subtasks, i.e., across all within-game activities and activities from outside the game, accessed by a given user, that use the same microtasks.

Embodiments of a virtual world engine may use personalized incrementalism, combining strong areas and weak areas in tasks, morphing strong skills toward weak skills, approximate successes (=degrees of mastery), and confidence building through subliminal hinting. This may be used, for example, in order to exercise a skill a user may be weak in while maintaining strong motivation and engagement.

Personalized incrementalism may utilize a measure of how much the level of challenge should increase to optimize learning and motivation for this user, based on measurements of how attentive the user stays, how much progress they make, and/or how motivated they stay given different increments. An average tolerance factor for a given user may be used as computer machine input. Alternatively, for example, since the tolerance for increments in the level of challenge may be less in an area of weakness, it may be preferable to utilize a subset of data in assessing a degree of tolerance for increasing the level of challenge.

When combining strong and weak skills, an engine may utilize an assessment of strong versus weak areas according to the User Profile (including working memory performance measurements) and then develop, for example, an activity to exercise one weak area in the context of a task that depends on a few strong areas plus one weak area. This mode allows a user to have some success and achieve some mastery, so they stay motivated, while still being able to exercise their weak area. Alternative embodiments may balance the number of strong/weak areas differently (e.g., one or more weak and one or more strong areas.)

An engine may utilize morphing to combine strong and weak skills in a many strong/one weak combination to fewer strong/one weak or even one strong/one weak skill. Embodiments may include more than one weak skill in a combination. An engine may start from a strong skill and build links to reinforce a weaker skill. For example, if multiplication facts are strong and division facts are weak, an engine may select a range of approaches to "teach" the linkage between these concepts such as, but not limited to, demonstrating a relationship (e.g., An engine may provide a user, perhaps through a hint, with a rectangular array showing a multiplier, a multiplicand, and a product. The engine may then remove one of the three and ask the user to solve the appropriate equation. The engine may also alternate which variable is missing, vary an order of asking problems, and provide visual examples with real world objects.).

In another example, if verbal working memory is weak, an engine may first reinforce concepts with clear, simultaneous visuo-spatial examples and verbal examples. It may then deliver more sparse visuo-spatial models.

Partial scoring allows for partial successes in a scoring algorithm embodied in a microtask generated by a virtual world engine. For example, coming close to right, only requiring approximation to the optimal solution, etc., but allowing for even more points/reward/gain when closer to right while becoming more stringent if the associated user profile reflects a threshold probability that can be tolerated while staying motivated. For example, in a visuo-spatial memory exercise, if a user can earn points for remembering location of a stimulus, the user may earn fewer points if at some distance (not too far) from where the stimulus occurred, but a lot more points if right on target. The engine may also provide the user with immediate feedback (e.g., after the user guesses location, the user sees the stimulus again in the original location, and sees the points they could have earned if more accurate).

Non-subliminal hinting and subliminal hinting (e.g., visual, musical, aural, etc.) provide another option for allowing a user to solve a microtask and receive credit/points thereof. Subliminal hinting can help boost user confidence and make more willing to work on an area of weakness.

Hinting

A virtual engine may assess that a hint should be calculated and provided through a user interface. As an example, if the user exceeds a certain amount of time for solving a microtask where the microtask is focusing on a weak skill for that user, prior weak performance by the user on similar problems, or other criteria, a hint is appropriate. Hints may comprise a variety of forms including, but not limited to: non-subliminal hint (e.g., verbal or textual); subliminal visual hint (answer, strategy (e.g., demonstrate near-10s strategy on number line or rectangular array), problem structure, etc.); subliminal musical hint (e.g. leitmotif); and/or subliminal or non-subliminal movement hint.

With regard to leitmotifs, a subliminal hint may jolt a user's memory by building an association over time through various aspects of game play between a segment of music and a particular problem, solution, hint, strategy, etc. In this way, the user may recall a way to solve a problem because over time a particular motif has been played in the background each time that methodology has been demonstrated.

A virtual engine may further calibrate game response to provide a gradual transition from a non-subliminal hint to a subliminal hint to a briefer subliminal hint to no hint (and combinations/subsets thereof) to further help the user. Hints may also include: teaching specific strategies to accommodate a weak area; videos; mentor advice; and/or reminders of previous similar problem(s).

The following pseudocode describes in detail implementation of the foregoing, namely it shows the method for choosing hinting approaches, and the implementation of various hinting approaches including subliminal hinting. The methods defined here can be called from either the external or the internal APIs, as described earlier. These hints can be used by an activity when the player has a problem with a task. They may be used when the player enters a wrong answer or a timeout threshold is reached while waiting for a user answer. The call to GenerateHintSequence will retrieve, from the hint profile for the microtask, activity, and player, the prioritized sequence of hints. These hints can include any form of hint described in the hint profile herein below.

GameActivity.ProvideHint (MicrotaskID, ActivityID, ProblemParms, PlayerID) {
    *HintTypeSequence;
    *HintPerformance;
    HintTypeSequence=GenerateHintSequence(MicrotaskID, ActivityID, ProblemParms, PlayerID);
}
GenerateHintSequence (MicrotaskID, ActivityID, ProblemParms, PlayerID) {*HintTypeSequence;
    HintTypeSequence=GetHintProfile(MicrotaskID, ActivityID, ProblemParms, PlayerID);
    Return(HintTypeSequence);
}

The game activity can call ExecuteHintSequence to execute hints, in order, until the user gets the problem correct or the game activity decides to abandon trying and returns a wrong answer—which will then influence future adaptation for this user for this microtask (as implemented in the pseudocode for microtasks in the appendix). The call the GenerateHintSequence will retrieve, from the hint profile for the microtask, activity, and player, the prioritized sequence of hints. These hints can include any form of hint described in the hint profile herein below. The hint performance becomes part of the player performance reported back to the microtask as defined in the pseudocode in the appendix.

HintPerformance=ExecuteHintSequence(HintTypeSequence, MicrotaskID, ActivityID, PlayerID);

The hint profile will have three levels of specificity for hint types:
based only on microtask
based on microtask and activity
based on microtask, activity, and player The goal is to choose the hint sequence from the greatest level of specificity that is based on at least Threshold number of data points. From that, choose the hint type sequence most likely to succeed with fewest hints.

The hint profile will have three levels of specificity for hint types:
based only on microtask
based on microtask and activity
based on microtask, activity, and player The goal is to choose the hint sequence from the greatest level of specificity that is based on at least Threshold number of data points. From that, choose the hint type sequence most likely to succeed with fewest hints.

The hint types include (at each level of specificity):
subliminal answer
subliminal mental model diagram (showing problem superimposed on the key mental model for this problem type, e.g., number line, fraction strips, pie charts, subdivided rectangular arrays) subliminal motion (for those activity types in which player indicates answer by choosing or moving a physical object in the scene)
subliminal leitmotif
non-subliminal mental model diagram
HintProfileUpdate (MicrotaskID, ActivityID, PlayerID, ErrorMode, HintPerformance)

The following pseudocode are the instructions to update the hint profile for this microtask in general, and more specific instances for this activity, and more specific instances for this player. This is called by the microtask as shown in the pseudocode in the appendix and in FIG. 3 module 370. Given player performance based on this hint, HintProfileUpdate will update counts of types of hint types tried and update counts of player successes following this hint type. Once the counts are updated, this code recomputes the prioritization order of hint types for this microtask, for this microtask/activity, and for this microtask/activity/player.

HintProfileUpdate (MicrotaskID, ActivityID, PlayerID, ErrorMode, HintPerformance)
{
    UpdateHintProfileCounts(MicrotaskID, ActivityID, PlayerID, HintPerformance);
    RecomputeHintProfile(MicrotaskID, ActivityID, PlayerID);
}

Evaluation of Missing Background and Backtracking

Missing skills may be assessed and backfilled by utilizing a hierarchy or directed graph explicitly specified for all of the skills, knowledge, and underlying mental models used in the game along with the linkages between them (e.g., a link indicating a relationship and/or dependency between specific skills, pieces of knowledge, or mental models), possibly in combination with a user-specific graph (a neural linking structure graph) indicating the strength of the user's skill, knowledge, or usage of a mental model for all those covered in the graph along with links indicating the strength of relationships between nodes for that user. When a gap is detected by an engine, the engine may backtrack through incoming arcs to see what skills/models/knowledge items are needed for the current level and recursively test to determine whether each (or a certain quantum) of the predecessor skills/models/knowledge items are strong. If gaps exist, the engine may backtrack again from the identified gap to calculate whether additional gaps in the graph exist. The engine may repeat this testing recursively to build a map of missing skills/models/knowledge items. Then, starting from the earliest/simplest missing skills/models/knowledge items, an engine may calculate problems to reinforce one of the missing blocks and, once strong, forward propagate until all required background skills/models/knowledge items are present (and at a certain degree of strength). Finally, the engine can use microtasks directed to the original new skill/model/knowledge item.

An engine may sequence the techniques disclosed herein based on a given user profile, type of problem, nearness of problem to scaffolding, evaluation, relevance/effectiveness of technique to problem type. Data on the response to the chosen backoff approach may be fed back to the user profile to use as a computer machine input in future strategic assessments.

Development

Figure 5:
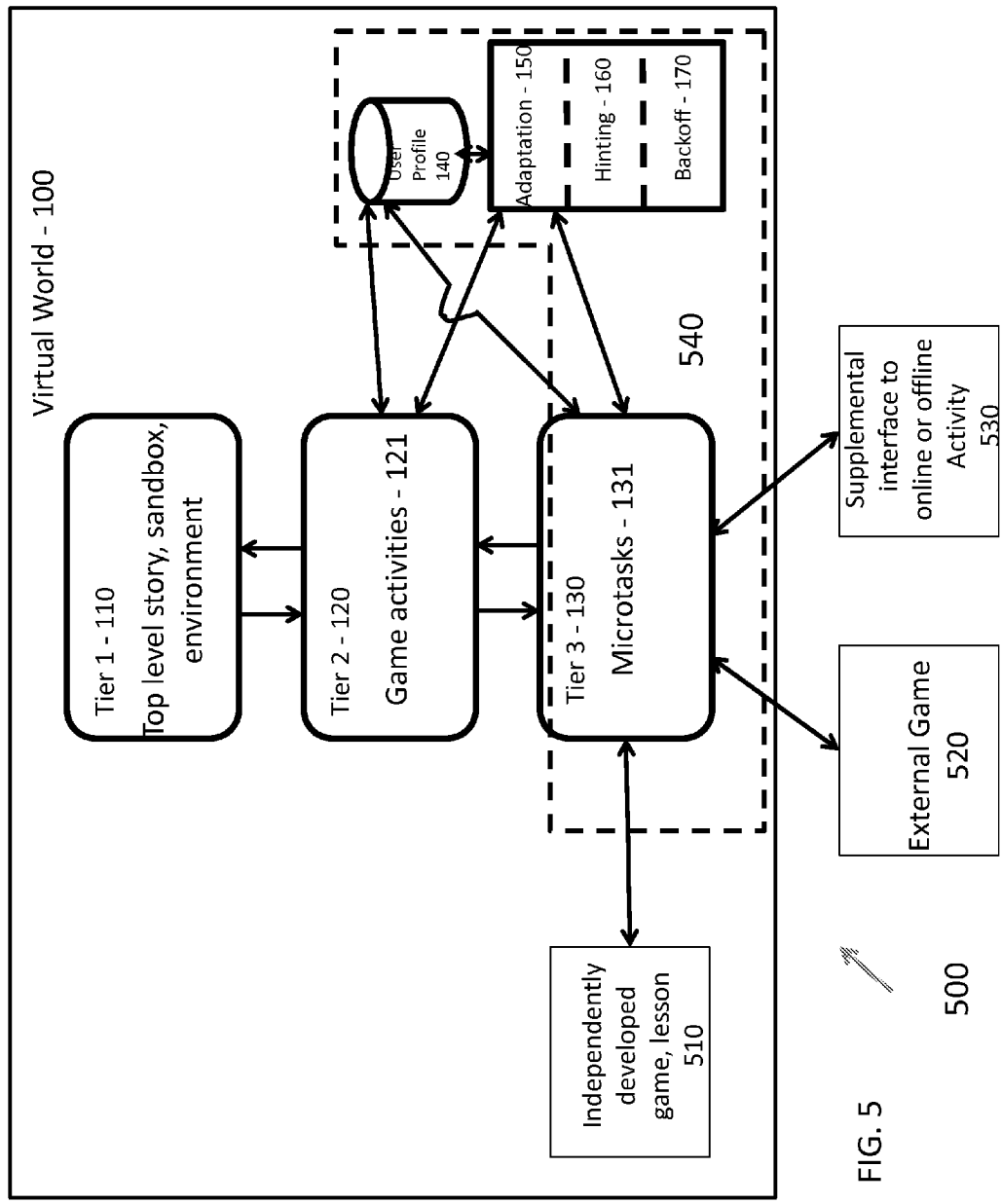
FIG. 5 is conceptual block diagram of an ecosystem in which multiple users in a virtual world may be disposed and through which microtasks may interact.

Referring to FIG. 5, a user or supervisor may be provided with a tool to configure training exercises, to optimize and unify the learning experience for a given user. The engine may track user activities across the virtual world 100 as well as outside the virtual world to enable an even greater feedback loop. Versions of a toolkit may include a scripting language to a drag/drop interface to define problem types, ranges, and more. Additionally, versions of a toolkit may access microtasks and/or user profiles. A game engine may use these computer machine inputs to create a micro-training exercise or more complex tasks within a given user context. A game engine may reference a User Profile for guidance in choosing problems for a micro-training exercise or more complex task. The user profile may be updated to reflect user performance on that micro-training exercise or more complex task. A computer machine may automatically surface such an exercise either in isolation or in a contextually appropriate surface form for where the user is in the game sequence. A computer machine may also provide automatic feedback regarding the progress and/or completion of a developed training exercise.

Combining Microtasks

Figure 6A:
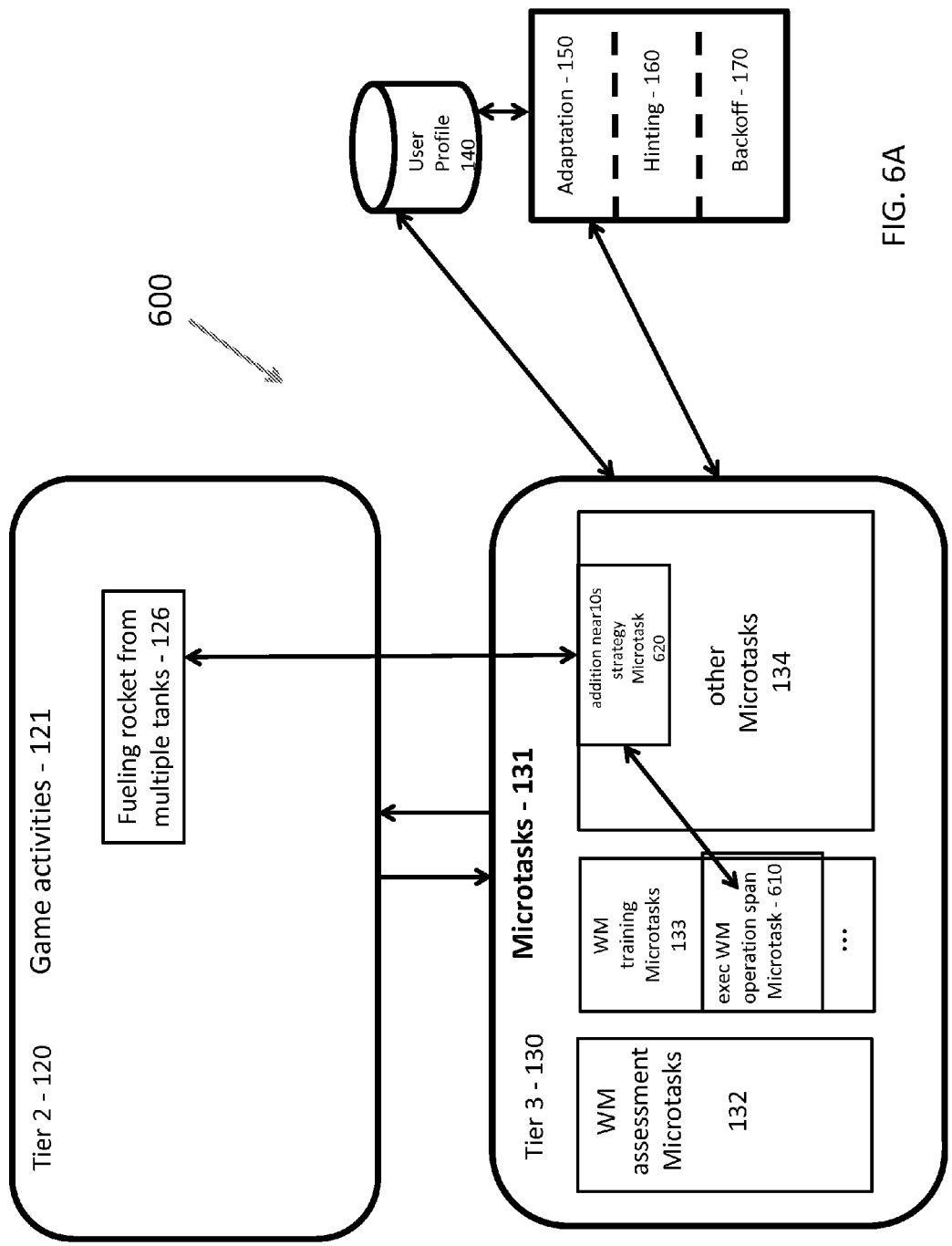
FIG. 6A is a conceptual block diagram of a surface form for a subtask that may be developed by combining multiple microtasks.
Figure 6B:
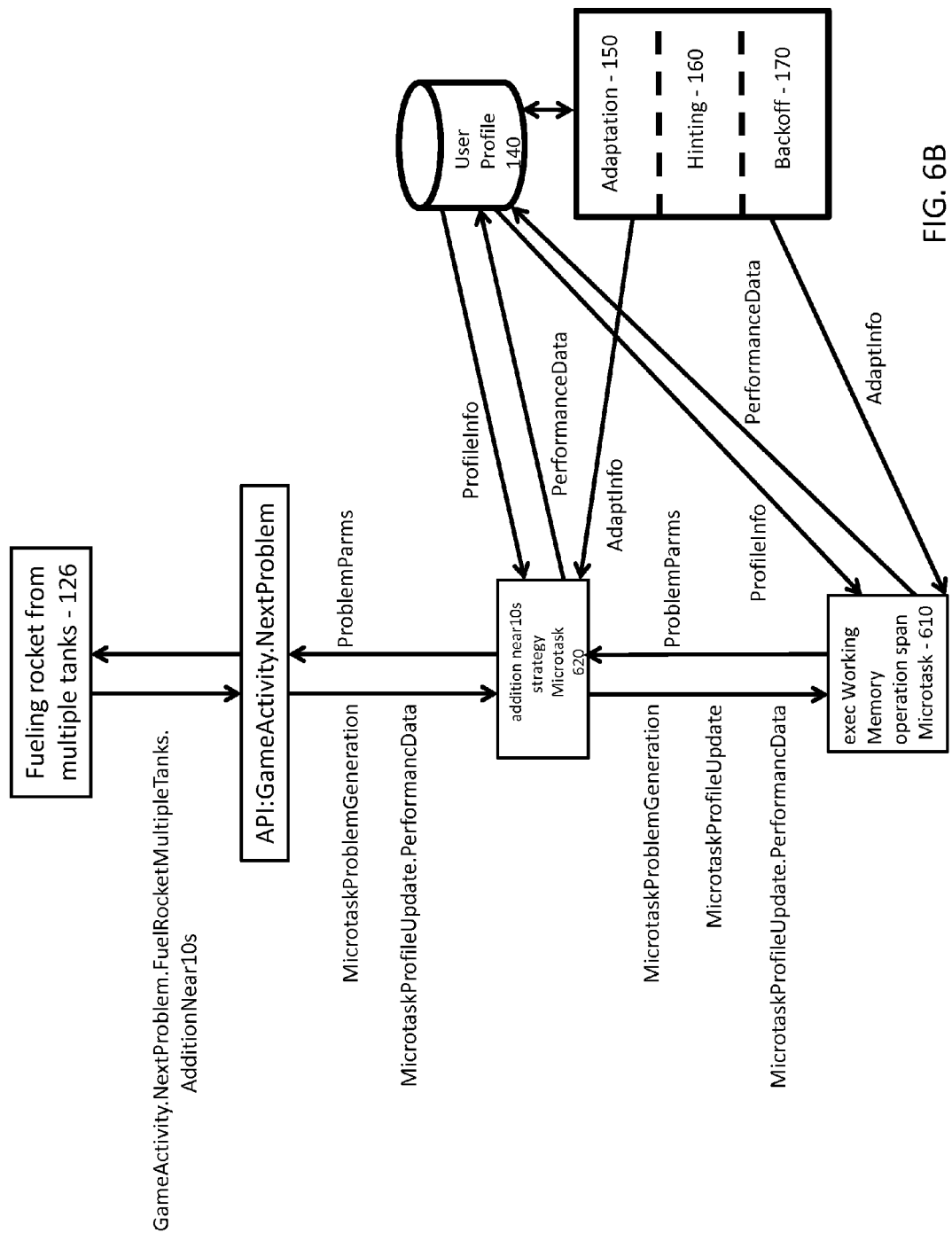
FIG. 6B is a conceptual block diagram of a surface form for a subtask showing greater detail.

Referring to FIGS. 6A and 6B, embodiments disclosed herein may include a flexible model for combining microtasks to provide a generalized methodology to adapt any activity type (e.g., a math-learning activity, language-learning activity, etc.) to a controlled and adapted working memory exercise. Embodiments may utilize the generality of microtasks to feed into many different surface forms, even when used in external games. The combination of a variety of types of microtasks is contemplated (e.g., two working memory microtasks, a working memory and non-working memory microtask, two non-working memory microtasks, multiple microtasks, nested/cascading microtasks, etc.) through all kinds of surface forms. Embodiments of working memory microtasks may be combined with a variety of other microtasks when appropriate whether they be arithmetic (e.g., addition, multiplication, near-tens, etc.); language learning (e.g., pronoun resolution, nested clauses, etc.); chemistry (e.g., balancing chemical equations, etc.), political science, history, geography, or even combinations of subjects.

The invention provides a framework to utilize working memory microtasks in combination with other microtasks exercising learning activities to provide an experience mimicking how people actually use working memory (as opposed to testing working memory in isolation via, for instance, IQ tests). This may more likely facilitate achieving generality in addition to or alternative to simply improving a specific working memory exercise (e.g., by drilling it over and over again). Thus, embodiments disclosing the combination of microtasks, including one or more working memory microtasks, may enhance the ability of a user to transfer certain skills to different kinds of surface tasks or different kinds of activities that exercise the same working memory modules.

The invention further provides a framework to create activities by combining microtasks into a variety of surface forms to increase salience and motivation because an activity supports a longer term goal that a user is trying to accomplish in the game.

The mechanism, as hereinbelow explained, can be easily generalized and applied to any grouping of relevant microtasks. Different approaches may be utilized to combine microtasks. For instance, embodiments may utilize predefined microtasks that are preprogrammed to specifically call and receive input from another microtask. Such linkages may be defined where certain parameters from each of a set of microtasks overlap (e.g., number of items to manipulate, from a working memory microtask, and number of addends, from an addition microtask) or where some other relationship between the microtasks is explicitly defined. In other embodiments, a microtask may be predefined to search a library of microtasks for those that could provide input on a specific parameter. Alternatively, a sophisticated end-developer may be able to choose between different combinations of microtask linkages (e.g., as exposed through an API), wherein each combination comes with its own set of predefined linkages.

Microtasks may be nested. The use of nested microtasks may or may not be visible to an outside developer. Thus, embodiments may provide a platform in which the microtask called by Tier 2 to construct the problem will be the microtask to resolve the various inputs and return problems to Tier 2. If microtasks are nested, resolution may occur at the level of the calling microtask and cascaded upward before computer machine inputs are returned to the microtask called by Tier 2 to construct the problems returned to Tier 2.

Examples

An example of application of the invention is shown in FIGS. 6A and 6B. Referring to FIGS. 6A and 6B, a system may provide a working memory training microtask 133 including "Executive WM Operation Span" Microtask 610 and another microtask 134 including "Addition Near 10s Strategy" Microtask 620. The "Addition Near 10s Strategy" Microtask 620 may provide a framework for creating addition problems involving the near-tens strategy utilizing the user profile 140 as well as the adaptation 150, hinting 160, and backoff 170 modules. The "Executive WM Operation Span" Microtask 610 may provide a framework for determining the parameters of a problem for exercising operation span working memory utilizing the user profile 140 as well as the adaptation 150, hinting 160, and backoff 170 modules. FIG. 6B shows the functions in greater detail than FIG. 6A, particularly illustrating the message passing functions of microtasks. The API Game Activity:NextProblem passes messages between the element 126 of game activities 121 and the example "addition near10s strategy" Microtask 620. Problem parameters are sent from Microtask 620 and Microtask problem generation and MicrotaskProfileUpdate.PerformanceData are returned to Microtask 620. Profile information are fed to Microtask 620 along with adaptation information from adaption 150, and performance data is returned to the user profile 140. Microtasks 620 and 610 directly exchange messages and update the user profile 140. Functional operations are explained below.

The addition near-tens strategy generally refers to a mechanism by which a sum is computed by a person by rounding the addends to the nearest ten and adding/subtracting the difference from rounding from the intermediate sum (e.g., a simple example of an addition problem designed to utilize the near tens strategy might be: 29+50>>30+50=80→subtract "1" to reach the answer value 79. In this example, only one addend needs to be rounded and it is only one number away from the near ten). An individual's Working Memory may be challenged in this scenario because the user is doing one thing (e.g., adding 50+30) but, in their working memory, the user has to retain that after they compute the intermediate sum, they need to go back and subtract "1", i.e., they need to perform an operation on the intermediate sum.

A more challenging problem may be represented by (29+49). In this problem, working memory is further tested because both addends required rounding and will require a subsequent subtraction task, thereby requiring maintenance of two items in working memory instead of just one which then operate on the intermediate result. Further challenge may be achieved by increasing the complexity of the items that must be maintained in working memory. For example, in the context of the "Addition Near 10s Strategy" Microtask, complexity may be increased by combining both adds and subtracts to remember to apply to the intermediate result (e.g., for a problem like 29+51) and/or complexity may be increased by combining different magnitudes to remember to add/subtract to the intermediate result (e.g., for a problem like 28+49). In summary, the "Executive Working Memory Operation Span" Microtask may determine the number of items to maintain in memory as well as the complexity of those items (in terms of how they will operate on intermediate results), and the "Addition Near 10s Strategy" Microtask may translate the number of items into the number of addends that need to be rounded to a near 10 and may translate the complexity into either or both of: the combination of remembering both adds and subtracts, and the combination of different magnitudes to be added and subtracted. The "Addition Near 10s Strategy" Microtask may make additional decisions about the difficulty of the task, such as the total number of addends and the size of the addends (e.g., two-digit addition, three-digit addition, etc.).

In more detail, on the working memory side, the "Executive WM Operation Span" Microtask 610 may calculate, using input from the user profile 140, adaptation, 150, hinting 160, and backoff 170 modules, the number of items and their complexity that a given user can handle or that would be the best next step in training the user's working memory, which is communicated to the "Addition Near 10s Strategy" Microtask 620. On the addition side, the "Addition Near 10s Strategy" Microtask 620 may use the computer machine input regarding number of items from "Executive WM Operation Span" Microtask 610 in conjunction with its own computation based on the User Profile 140, and adaptation 150, hinting 160, and backoff 170 modules to determine how many "addends that need to be rounded" that should be included in the problems returned to Tier 2.

The "Addition Near 10s Strategy" Microtask 620 may use the complexity factor, returned as computer machine input by the "Executive WM Operation Span" Microtask 610, in conjunction with its own computation based on the user profile 140, and adaptation 150, hinting 160, and backoff 170 modules, to further compute the degree of complexity to be exhibited by the problems including, but not limited to: a) how much to combine both adds and subtracts as operations to compensate for the rounding of addends; and b) the distance each addend is from the near ten (e.g., if the number is 59, then the user only needs to remember to subtract 1 after computing the intermediate sum, but, if the number 58 is rounded, then the user must remember to subtract 2 after computing the intermediate sum). Additionally, the "Addition Near 10s Strategy" Microtask 620, using input from the user profile 140, and adaptation 150, hinting 160, and backoff 170 modules, may make further decisions about the difficulty of the problems returned to Tier 2 including, but not limited to: a) the size of the addends (e.g., 2-digit numbers, 3-digit numbers, etc.); and b) the total number of addends in the problem (whether rounded or not).

Thus, a "number of items" factor and a "complexity" factor, returned as computer machine input by the working memory microtask, may be layered on top of the parameters offered within the "Addition Near 10s Strategy" Microtask 620 where such relevant linkages are explicitly defined.

Embodiments of this framework may allow for the combination of microtasks to provide a mechanism to link parameters from one microtask to relevant parameters from another microtask. Referring to FIG. 3, the process flow depicted therein may be further understood in the context of FIGS. 6A and 6B, which shows one example of how microtasks may be combined. There may be a high-level flow between the processes of FIG. 3 and FIGS. 6A and 6B. In an example, Tier 2 may call a first microtask (126 calls 620). That microtask 620 but generically referred to as 300 in FIG. 3) may traverse through several steps in which parameters are interpreted 310 and profile information 320 is obtained along with adaptation/hinting/backoff information 330. If that microtask 620/300 is designed to request additional input from other microtasks (working memory and/or other microtasks), a nested loop may occur between steps 330 and 340. The dependent microtask may then perform operations corresponding to steps 310-330. It may call additional dependent microtasks (thus creating a nested hierarchy) or, if finished, may generate problem parameters relevant to working memory operation span (e.g., number of items and complexity) 340 and then return results, as computer machine input as its step 350 to its parent microtask. This process may iterate until all the results have cycled through the nested hierarchy to the first microtask called by Tier 2, at which point, the first microtask may proceed to step 340 to generate a problem. The process flow defined by FIG. 3 may continue until step 370, at which point results from the user performance, obtained at step 360, may be updated to aspects of the user profile 140, and adaptation 150, hinting 160, and backoff 170 modules, affected by each microtask that was called. Updates may occur in a predefined order (e.g., reverse cascade, FIFO, LIFO, or any other paradigm chosen for this mechanism).

Referring to FIGS. 6A and 6B, the "Addition Near 10s Strategy" Microtask 620 may define and/or manipulate multiple categories and/or parameters to vary difficulty. The "Addition Near 10s Strategy" Microtask 620 may access the user profile 140 to initially set parameters associated with a given problem's construction based on that user's past performance in combination with other aspects of the user profile 140. Alternatively, the "Addition Near 10s Strategy" Microtask 620 may obtain further inputs before calculating a degree of difficulty.

The "Addition Near 10s Strategy" Microtask 620 may call on the "Executive WM Operation Span" Microtask 610 to provide further inputs. The "Executive WM Operation Span" Microtask 610 may also access the user profile 140, for example the Working Memory Profile, the Motivation Profile, and the Time Series to determine the user's current level of ability on working memory operation span tasks and to determine an appropriate level of challenge to present to the user. As a result, the "Executive WM Operation Span" Microtask 610 may return values for number of items and complexity to the "Addition Near 10s Strategy" Microtask 620.

While the foregoing example has been provided for demonstration purposes, it should be appreciated that the fluidity of the interaction between the microtasks 131, the user profile 140, adaptation module 150, hinting module 160, and backoff module 170 allow for the creation of endless varieties of problems with defined levels of difficulty, complexity, etc. that are computed in accordance with an evaluation of a given user profile 140 that are injected in an endless variety of game activities 121, such as fueling a rocket from multiple tanks 126. By maintaining a feedback loop between the microtasks 131 and the user profile 140, the game engine ensures that a user is appropriately exercising the capabilities represented by each microtask to the fullest extent possible (and has a built-in mechanism for backing off 170 the degree of difficulty if the user's performance falters at higher levels of difficulty). Other combinations of microtasks may have other relevant linkages between parameters (i.e., the linkage of number of items and complexity is relevant to this particular paring of microtasks in the example described here, but an infinite variety of parameters and linkages are possible).

Once the appropriate degree of difficulty along all relevant dimensions has been determined through the interaction of the microtasks 131 with the user profile 140, an engine, configured with the called microtask, can then populate those parameters and return the instantiated problem to the game activity 121.

Viewed as a process, embodiments might construct a problem using a combination of microtasks, as depicted in FIGS. 6A and 6B, in conjunction with a process flow executed via an engine configured accordingly, such as the one depicted in FIG. 3. A game activity, such as fueling a rocket from multiple tanks 126, may be configured to request an addition problem from the game engine. Fueling 126 may be configured to graphically present "x" number of tanks to a user with numbers (or other visual markers) to indicate how much fuel is in them and may be further configured to request an addition operation to determine how much fuel is available for the rocket ship.

The game engine may call one of the "other microtasks" 134 (e.g., an Addition Microtask). The Addition Microtask may access the user profile 140 to determine what that particular user is able to handle in terms of a potential problem. It may return a value to the game engine indicating that the particular user has not mastered near tens strategy yet. The game engine may then call an "Addition Near 10s Strategy" Microtask 620 (in other embodiments 620 may be a sub-module of the Addition Microtask rather than a separate microtask) which may ultimately be contextualized in the game activity or the surface form of fueling a rocket 126. The "Addition Near 10s Strategy" Microtask 620 has not yet returned the problem. It may access the user profile 140 and determine the degree of difficulty along a number of dimensions to which the user has practiced this strategy previously (e.g., 2-digit problems or 3-digit problems . . . some of the parameters may overlap with working memory tasks or may be exclusive to the addition near tens domain depending on how these microtasks have been explicitly defined). Next, the "Addition Near 10s Strategy" Microtask 620 may call the "Executive WM Operation Span" Microtask 610 to determine how to set the number of items and degree of complexity to exercise that skill set. (The order is also exemplary and should not be considered a limitation on the flexibility of the overall framework.)

The ultimate decision of the type (e.g., near tens strategy), difficulty (e.g., 3-digit numbers), and complexity of a given problem from this process/workflow may be determined based on the parameters set in the user profile 140 (e.g., personalized incrementalism, motivation profile, etc.). The game engine may further evaluate if a given user has a particular deficit that is out-of-sync with a set of norms that the user is being compared against such that a given input parameter should be weighted more heavily in the calculation of the problem template. The game engine considers all of these input parameters in setting the template for the problem and then populating the problem and returning it to the game activity 121 such as fueling the rocket 126. Thus, a game engine may calculate completely different problems for different user profiles engaging in the same game activity 121 and even the same surface form (e.g., 126—fueling the rocket).

Another example demonstrates the flexibility of applying a working memory microtask to a chemical equation balancing microtask. For instance, a chemical equation may comprise compounds of varying degrees of complexity with varying combinations of elements.

Another example is a working memory microtask applied to language learning. A microtask may parse a set of nested clauses/parentheticals or track how a set of pronouns need to be resolved.

Application Program Interface (API)

Figure 8:
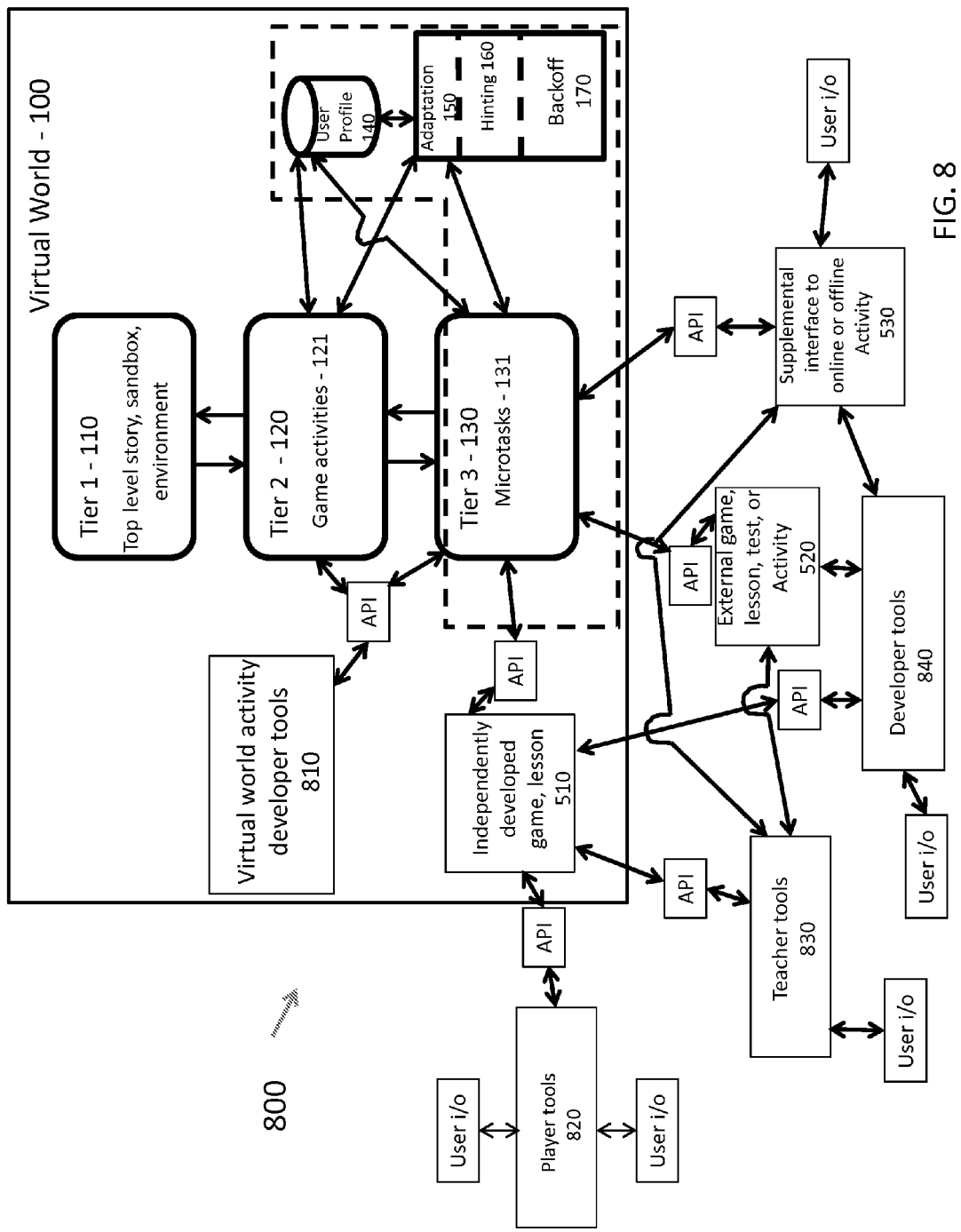
FIG. 8 is a conceptual block diagram of a virtual world model interacting in a larger ecosystem through a set of APIs.

Referring to FIG. 8, one or more application programming interfaces (APIs) (e.g., APIs associated with elements 510, 520, 530, 810, 820, 830, and/or 840) may provide access to a game engine that supports the virtual world 100 so that developers may grow a game 510 (also FIG. 5) within the context of a given virtual world 100, as well as develop or enhance external games 520, while taking advantage of microtasks 131 and user profiles 140 utilized within a given virtual world 100. These embodiments enable the developer to take advantage of all the pedagogical and neuroscience expertise embedded in the microtasks, and to take advantage of the user adaptation 150, hinting 160, and backoff techniques 170 embedded in the microtasks 131 and related adaptation modules 150, based on the user profile 140. Furthermore, the user profile 140 can be updated based on user performance in the developer's game. Therefore, the user profile 140 may be updated across any of the enabled ways the user accesses microtasks, from any developer's game. As a result, the adaptation may make decisions for the user based on their activities that use microtasks. In this way, the user has the advantage of a unified user experience across the activities in which they engage that make use of any of the APIs (and are so enabled), optimizing their learning experience and enabling them to have learning experiences across a much wider range of their activity. Developed games may be portable either as a self-contained application, as an activity within the virtual world which may be offered to a user of the virtual world as an additional available activity, as a mini-module within a larger platform, or as a supplemental interface development.

A self-contained application may be provided to an end-user through a variety of communication mechanisms and may have no effect on the operation of the virtual world other than possibly updating the same user profile used by the virtual world. However, the self-contained application will be able to take advantage of the virtual world microtasks and user profiles.

A gaming developer could utilize a set of hooks available through an API 520 to access education/training microtasks and use them in their own games (which may be further contextualized to support their own games' storylines and/or activities) as well as make use of the user profiles.

The following pseudocode shows the API that external developers can use to gain access to microtasks, and through those microtasks gain access to profile, adaptation, hinting, and backoff information for a user. The use of this API enables a unified user experience across all games the user plays—keeping any game using the API current on the user's capabilities and knowledge by supplying and updating user profile and adaptation information, and making the up-to-date information available to games using the external API.

Example Calls to API:

These example API calls show the external game and the API running in the same space. This can be extended to run as a web service using standard GET and POST request methods. This example is for an external game that asks a player to build a wall by adding fractional-sized bricks. In this example, the external game requests positive sizes only, since negative brick sizes do not make sense.

```
ExternalGameActivity.AddFractionalBricks (PlayerID) {
    *ProblemParms;
    *PerformanceData;
    ProblemParms=ExternalAPI.GameActivity.NextProblem
        ("FractionAddition", "BuildWallSection", "Positive-
        NumbersOnly", PlayerID, SubscriberID);
    PerformanceData=ExecuteGameActivity(ProblemParms,
        "AddFractionalBricks", PlayerID);
    ExternalAPI.GameActivity.ReportPerformance("Frac-
        tionAddition", PlayerID, SubscriberID, Performance-
        Data);
}
```

External API Code:
```
ExternalAPI.GameActivity.NextProblem    (MicrotaskID,
    ActivityID, ProblemConstraints, PlayerID, SubscriberID)
{
    ProblemParms=MicrotaskProblemGeneration(Micro-
        taskID, ProblemConstraints, PlayerID);
    Return(ProblemParms);
}
ExternalAPI.GameActivity.ReportPerfomance    (Micro-
    taskID, PlayerID, SubscriberID, PerformanceData) {
    MicrotaskProfileUpdate (MicrotaskID, PlayerID, Perfor-
manceData);
```

In addition to borrowing microtasks from a game engine, it may also be possible to develop an activity that will operate within the virtual world and possibly make use of characters in the virtual world including a character representing the user, (e.g., in this way a user could utilize the same character across may different activities provided by independent developers, accumulate experience and points, and benefit from a shared user profile, microtasks, and adaptation).

A supplemental interface developer may add exercises to a pre-existing game that are similar or complimentary to the pre-existing game and possibly utilize microtasks and user profiles from the virtual world 530. Alternatively, microtasks may be coordinated with non-online activities (e.g., users referring to a cell phone app for some microtasks, coordination, challenges, scorekeeping). Examples of such coordinated activity may include scavenger hunts, contests that involve gathering of resources, figuring out puzzles, and scoring in offline games (e.g., accomplish something and the user types in a code or scans something, such as a quick response (QR) code, to register progress and get the next clue or challenge).

Communication between a second application and a microtask borrowed from a virtual world may be two-way. Thus, usage may be reported back to a system maintaining a set of user profiles in computer memory to update the user profile to reflect the user's performance on the microtask and give "credit" to that user for activities/skills accomplished/learned even outside of the "virtual world". In this way, the user's learning experience may be unified and optimized across all activities they engage in which make use of microtasks from the virtual world (e.g., the second application, the virtual world, and all other games and activities using the API). An engine embodying the second application can access and update the same user profile, through the API, so all of a user's educational activities in all enabled games using the API are adapted based on the user's up-to-date knowledge, skill, and experience, thereby optimizing learning for the user no matter which game or activity they are using.

API Structure

An example of an API structure may be both object oriented and hierarchical and include microtasks for education, training, and assessment, including working memory, mathematics, and other types of learning. While examples herein focus on mathematical examples for the sake of explaining certain concepts, it should be understood that the principles of the microtasks disposed across the various tiers and accessible through the API may be applied to a wide variety of disciplines including science, art, language learning, and more.

An API may include hidden and accessible modules. The accessible modules can be directly used by developers. The hidden modules may not be viewed or altered by the developer, but may be used by the accessible modules as enablers of certain required actions. Both hidden and accessible modules may make use of microtasks. Examples of hidden modules include those that enable actions such as: communicating user performance parameters to the profile associated with that user; computing the next problem to present to a user based on that user's user profile and developer-supplied constraints; coordinating communication with the user's global profile while enabling reliable and fast supply of the next problems in the game (for example by locally caching problems or parts of a user profile); producing hints and feedback for the user, both subliminal and non-subliminal; determining when hints and feedback will be most useful to the user, based on their behavior and their profile (e.g., based on length of time for user input of answers); and/or instantiating underlying mental models (e.g., number lines, rectangular arrays for use in higher level modules that create arithmetic problems); creating problems based on underlying mental models combined with contextual information supplied by the developer (e.g., create an addition problem based on a number line instantiated as a ladder structure supplied by the developer for use in the game).

Non-limiting examples of accessible modules may include linear array number line arithmetic. Within linear array number line arithmetic, a developer can specify, for example, arithmetic operation (addition, subtraction, etc.); number types (whole numbers, fractions, mixed numbers, decimals, positives, negatives, etc.); number ranges; game based timing constraints; game context data structure (e.g., pass a pointer to a linear array instantiation of a ladder); orientation (vertical, horizontal, other); location; and text-to-speech synthesis for spoken feedback and hints. These accessible modules may, in turn, call on hidden modules to perform certain functions. For example, these functions may include generating appropriate problems based on the user profile; evaluating results (accuracy and timing); generating hints; and updating a given user profile with performance data on a given problem.

Higher level accessible modules (e.g., higher in the API) may include, for example, a general ladder building module for addition exercises. Such a module may enable a developer to choose parameters of a ladder and have it created. Such a module may also generate calls to, for example, the linear array number line module described above.

At an even higher level, for example, a general ladder task module may allow a developer to specify a task such as building a ladder to get to the top of X with time limit Y. Based on that, the general ladder task module may generate an activity with an entire series of arithmetic problems, facilitating ladder building by the user. This may generate calls to the general ladder building module and the linear array module, which would, in turn generate calls to the appropriate hidden modules.

Embodiments may include modules to provide developer feedback/analytics to help them improve their game and customize their game to specific users. A processor/engine may be configured to assess a user profile, past performance, learning objectives and even global data across a group of users to rank and present a prioritized set of microtasks that may be most useful to a given user at that point in their virtual world experience. The developer may design their system to choose, at any particular time, the highest priority microtask which also fits with the current game context.

Embodiments may also provide modules to provide developers the ability to explicitly create social groups to cooperate or compete on challenges. An example module may comprise a user matching module to create a group of players, based on their profiles, either of similar levels of skill or, alternatively, with complementary skills (e.g., to form a team).

Referring again to FIG. 8, modules facilitate lesson creation by allowing a developer/teacher to specify a set of parameters to automatically generate challenges/tasks by cross-referencing a set of desired parameters with a specific user's user profile. The problems may be administered to users with adaptation, feedback, and hints. User performance may be fed back to their profile. User performance on a given problem may be reported back to a teacher and/or a performance module including score, amount of time to solve, adaptation of a base problem to a specific User Profile to meet skill level, retries, backoffs, hints given, etc.

Exercise Parameter Profile

An exercise parameter profile may include one or more parameters, provided as computer machine input, including number of problems, features of problems across many dimensions, specification of sequences of problem types, specification of problem templates, and more. Problem parameters may be defined across an entire class, subgroups, or individuals. Problem parameters may be defined for a single equation or for a set of equations (e.g., an exam setting). Features of problems across many dimensions have limitless possibilities but a few illustrative examples are provided here: four digit additions; three digit multiplications; four digit additions with no carries; four digit additions with one carry from the units to tens place; three digit multiplications that only require knowledge of multiplication tables up to the 5 times table; and mental multiplication problems exercising near-10s strategy (along with strategy teaching).

Examples of the specification of sequences of problem types include, for instance, three problems with four digit addition, then three problems with three digit multiplication. An exercise profile may include a specification of problem templates, so that an engine can automatically generate problem instances adapted to each user's skill levels—some templates may be supplied by the system, others may be specified by the teacher, for example, a template of related-rate word problem. (e.g., "Two cars leave Cleveland at the same time, traveling in opposite directions. Car A is traveling X miles per hour. Car B is traveling Y miles per hour.") Variables (e.g., X) may be automatically populated by the engine. The magnitude of those numbers may be chosen according the User Profile indication of skill level and any direct specification of magnitude from the teacher.

Hints and tutoring can either be auto-generated by the system for templates supplied by the system, or for templates created by the teacher. The teacher can supply hints and feedback in the form of text, video, or other media. A library of micro-lessons/hints may be provided for reference to find useful feedback mechanisms.

An exercise profile may include the ability to embed supplementary materials (e.g., embed a video, a voice recording of themselves giving an instruction, a pointer to some material on the web, etc.); define exercises or have the engine define an exercise based on analysis of the User Profile, past performance and learning objectives; define a scoring strategy that may be customized per user or for a group according to abilities, status, problem difficulty, etc.; and/or define the environment or game activity for the micro-tasks (e.g., battles, building, storylines, etc.). An exercise profile may further include the ability to define the parameters of social involvement including: teams (composition, limits, allocation of duties, etc.); scoring structure; rewards (e.g., if a user gets enough points, they get to skip a homework or gain point(s)/game-money). It may also include functionality to define a leader board or scorecard to display a set of individuals (e.g., a team, a microcosm, public, select individuals, etc.). An exercise profile may also allow for the customization of reporting by providing options such as: request performance reports for individual users covering performance summary, current strengths, weaknesses, status of all skill types, User profile information such as learning styles and preferences, suggestions for supplementary material; identification of emerging problems and opportunities for intervention; pointers for dealing with problems/interventions; summaries of performance across a community by problem-type; period of time reported on; and more.

Game Utilities

Micropayments may be incorporated into the environment if one "sells" the usage (possibly within the virtual world) of components created using a developer kit or the API or the modules for lesson creation. For example, users may sell the usage of training exercises they have developed using a developer kit, developers may sell the usage of game activities they integrate into the virtual world using the API, or teachers may sell the usage of lessons created using lesson creation modules and exercise parameter profiles. Payment may be determined by usage and learning success of the module sold.

Figure 7:
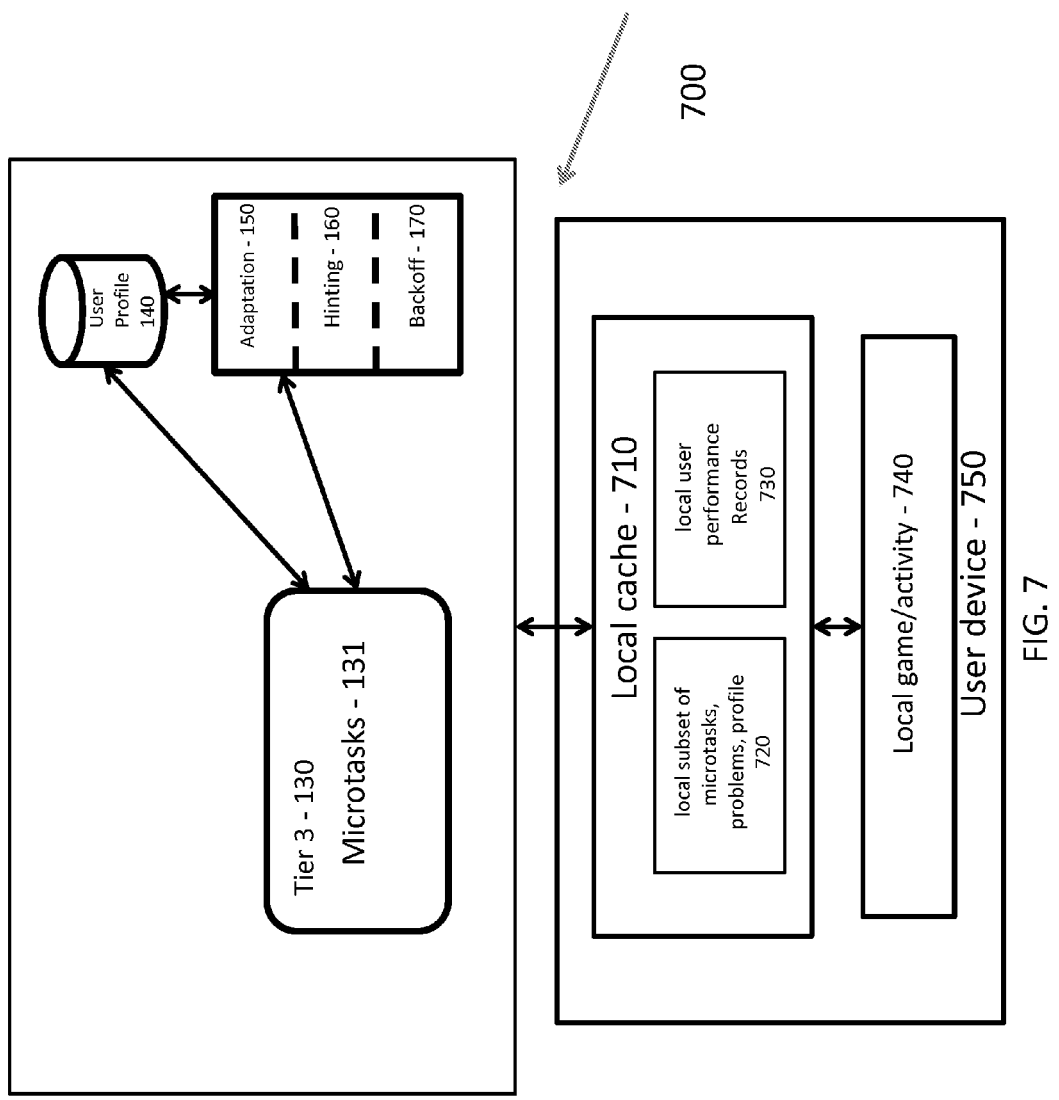
FIG. 7 is a conceptual block diagram of offline interaction with a virtual world via local caching.

Referring to FIG. 7, there is shown a configuration 700 including a local caching system 710 to permit usage of the virtual world even when a user device 750 may be temporarily offline via asynchronous two-way communication. A caching system 710 may also be used when an external game or supplemental interface uses the API to access microtasks, user profiles, and/or adaptation capabilities in the virtual world. A subset 720 of relevant information from a user profile may be cached locally 710 so that a user can proceed with a game 740 even if communication to the user's global profile is temporarily cut off. Similarly, a set of problems can be cached locally 720 in a local cache 710. In the event that communication to the user's global profile is temporarily cut off, this module may maintain records of user behavior until such communication is possible, and at that time, update the user's global profile with the user performance records 730 since the previous communication.

The local caching of problems, profile information, and user behavior can also be used to optimize the choice of when to communicate with the user's global profile so as to minimize interference with the ongoing game action.

Technical Variations

Any of the systems, logic and devices can be implemented as machine readable instructions in any programming language of any generation (e.g., 1GL, 2GL, 3GL, 4GL, or 5GL) such as, e.g., machine language that may be directly executed by a Processor, or assembly language, object-oriented programming (OOP), scripting languages, microcode, game development kits/environments/APIs, etc., that may be compiled or assembled into machine readable instructions and stored on a machine readable medium contained in a computer machine. Alternatively, such computer-executable instructions may be implemented in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components. Pieces of the system may be designed to run on servers, on the world wide web, on any device, for example laptop computers, PCs, desktop computers, smartphones, intelligent watches, intelligent glasses, refrigerator consoles, virtual reality environments, vehicle systems, game consoles, home entertainment systems, home control systems, and any other device that includes any form of computational capability. Pieces of the system may run in conjunction with or communicate with a wide array of devices and/or systems, for example EEG (electroencephalography) systems or other brain or behavior monitoring systems, eye trackers, movement trackers, speech recognizers, microphones, physical game elements, brain stimulation systems, body chemistry monitoring systems, drug delivery systems, electronic medical records, etc.

APPENDIX

A listing of source code associated with one embodiment of the invention is included as an appendix filed with this patent application and comprises a part of this specification.

CONCLUSION

The invention has been described in connection with specific embodiments. Other embodiments are within the scope and of the invention. It is therefore not intended that this invention be limited, except as indicated by the appended claims.

What is claimed is:

1. A method comprising:
providing a computation engine and digital memory for storing information, receiving training programming material, and executing computer instructions for interacting with a user according to a hierarchy of a theme;
providing a user profile for each user, the user profile comprising storable information encompassing abilities and characteristics of a user, the user profile being interactively revisable;
providing as a first tier in the computer machine a virtual environment comprising a game realm in accordance with the theme of the virtual environment;
providing as a second tier a plurality of game activities within the game realm of the virtual environment;
providing as a third tier a plurality of microtasks required of the user suited to the user profile;
causing the computation engine to present to a user a plurality of microtasks in at least one game activity in the virtual environment through a user interface;
receiving responses from the user through the user interface in response to the microtasks;
adapting the user profile to the learning level of the user in response to user execution of the microtasks;
hinting at suitable actions to the user according to current states of the user profile; and
backing off the microtasks required of the user where the user cannot satisfactorily execute the microtasks according to the achievement criteria, in order to train the user.

2. The method of 1, wherein the microtask executes a procedure comprising:
interpreting input parameters;
retrieving user profile information;
retrieving adaptation information, hinting information and backoff information relevant to the user profile;
generating problem information in form of parameters including at least problem details and correct solutions;
in response to activity, reading performance result of the user; and
based on performance result of the user, updating the user profile and criteria for the adapting, the hinting and the backing off.

3. The method of claim 2 wherein as part of the problem information, generating hints.

4. The method of claim 2 wherein as part of the problem information, generating subliminal hints.

5. The method of claim 2 further including microtasks for assessment with stopping criteria.

6. The method according to claim 1 wherein the microtask, after use, cause the user profile of the users to be revised.

7. A system for training comprising:
- a computation engine and digital memory for storing information, receiving training programming material, and executing computer instructions for interacting with a user according to a hierarchy of a theme;
- a user profile component for each user, the user profile component comprising storable information encompassing abilities and characteristics of a user, the user profile being interactively revisable;
- a first tier in the computer machine a virtual environment comprising a game realm in accordance with the theme of the virtual environment;
- a second tier comprising a plurality of game activities within the game realm of the virtual environment;
- a third tier comprising a plurality of microtasks required of the user suited to the user profile;
- an adaption module coupled to the user profile component for adapting the user profile to the learning level of the user in response to user execution of the microtasks of the game activities;
- a hinting module coupled to the user profile component for hinting at suitable actions to the user according to current states of the user profile; and
- a backoff module coupled to the user profile component for reducing the microtasks required of the user where the user cannot satisfactorily execute the microtasks according to the achievement criteria.

8. The system according to claim 7 wherein the microtask executes a procedure comprising:
- interpreting input parameters;
- retrieving user profile information;
- retrieving adaptation information, hinting information and backoff information relevant to the user profile;
- generating problem information in form of parameters including at least problem details and correct solutions;
- in response to activity, reading performance result of the user; and
- based on performance result of the user, updating the user profile and criteria for the adapting, the hinting and the backing off.

9. The system of claim 8 wherein as part of the problem information, generating hints.

10. The system of claim 8 wherein as part of the problem information, generating subliminal hints.

11. The system of claim 8 further including microtasks for assessment with stopping criteria.

12. The system according to claim 8 wherein the microtask, after use, cause the user profile of the users to be revised.

13. The system according to claim 7 wherein the user profile comprises sub-profiles, the sub-profiles comprising at least one of a personality profile, a neural link profile, and a motivation profile.

14. The system according to claim 7 wherein the user profile comprises at least a personality sub-profile, the personality sub-profile comprising an assessment of at least one of: whether the user is drawn to high stress action or more relaxing activities; whether the user is drawn to high risk or low risk; whether the user is highly explorative or less explorative; whether the user is social or a loner; whether the user is competitive or collaborative; and whether a user is ambitious or laid-back.

15. The system according to claim 7 wherein the user profile comprises a neural link profile, the neural link profile comprising nodes and linkages between nodes, each node being characterized by a node strength value representative of how well the user understands a skill or knowledge term represented by the associated node, and each link being characterized by a link strength value representative of how strong a connection is between nodes.

16. The system according to claim 15 wherein the computation engine is operative to calculate whether performance by the user of a microtask is inadequate as measured against learning goals juxtaposed with the user profile of the user.

17. The system according to claim 15 wherein the computation engine is operative to generate one or more hints comprising at least one of a hint derived from a mental model of the user, a subliminal visual hint for a predetermined period of time, a subliminal musical hint, and a subliminal movement hint for a period of time.

18. The system according to claim 15 further including a second computation engine and at least one application programming interface, the application program interface for controlling access to the first computation engine, access to the profile representing the user from a first computation engine, access to microtasks from the first engine, and performance reporting features allowing communication of results on microtasks performed by the user in the second computation engine back to the first computation engine.

19. The system according to claim 7 wherein the user profile comprises a motivation profile, the motivation profile comprising at least one of a first motivation assessment calculated by using different task complexity increase rates, a second motivation assessment calculated using different levels of user performance, and a third motivation assessment calculated using different problem and problem-type repetition rates.

* * * * *